(12) United States Patent
Rivera

(10) Patent No.: US 12,114,801 B2
(45) Date of Patent: Oct. 15, 2024

(54) BEVERAGE BREWER HAVING MOVING WATER DISPERSION

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 320 days.

(21) Appl. No.: 17/011,516

(22) Filed: Sep. 3, 2020

(65) Prior Publication Data

US 2021/0106166 A1 Apr. 15, 2021

Related U.S. Application Data

(63) Continuation-in-part of application No. 16/479,242, filed on Jul. 19, 2019, now Pat. No. 12,004,679.

(51) Int. Cl.
*A47J 31/44* (2006.01)
*A47J 31/10* (2006.01)
*A47J 31/46* (2006.01)

(52) U.S. Cl.
CPC ........... *A47J 31/4475* (2013.01); *A47J 31/10* (2013.01); *A47J 31/465* (2013.01)

(58) Field of Classification Search
CPC ....... A47J 31/10; A47J 31/4475; A47J 31/465
USPC .......................................................... 99/287
See application file for complete search history.

(56) References Cited

U.S. PATENT DOCUMENTS

| | | |
|---|---|---|
| 5,301,600 A | 4/1994 | Medema |
| 5,957,035 A | 9/1999 | Richter |
| 7,717,026 B1 | 5/2010 | Lassota |
| 2003/0150333 A1 | 8/2003 | Fischer |
| 2003/0213370 A1 | 11/2003 | Hammad et al. |
| 2004/0118299 A1 | 6/2004 | Garman et al. |
| 2004/0194631 A1* | 10/2004 | Pope .................... A47J 31/4478 99/279 |
| 2006/0102012 A1 | 5/2006 | Pope et al. |
| 2007/0017380 A1 | 1/2007 | Takizawa et al. |
| 2007/0295216 A1 | 12/2007 | Williamson et al. |
| 2009/0226585 A1 | 9/2009 | Wroblewski et al. |
| 2015/0327717 A1 | 11/2015 | Burrows |
| 2017/0000290 A1 | 1/2017 | Van Der Woning et al. |
| 2017/0119197 A1* | 5/2017 | Rivera ................ A47J 31/0631 |

(Continued)

FOREIGN PATENT DOCUMENTS

JP 2006280723 A 10/2006
WO 2015101428 A1 7/2015

*Primary Examiner* — Dana Ross
*Assistant Examiner* — Joseph W Iskra
(74) *Attorney, Agent, or Firm* — IP Strategies

(57) ABSTRACT

A beverage brewer includes a brewing material holder and a movable water-dispensing member configured to receive a flow of liquid and including ports configured to release received liquid into the brewing material holder. The brewer can also include a water-dispersing assembly disposed above the brewing material holder to receive the flow of liquid. The movable water-dispensing member can be couplable to the water-dispersing assembly to receive the flow of liquid. The water-dispersing assembly can include a reservoir having an outlet, such as a funnel. The movable water-dispensing member can be configured to move, such as to rotate, due to a force of pressure provided by the flow of liquid. The force of pressure provided by the flow of liquid can be caused, for example, by the weight of the liquid. The reservoir can include a constricted portion providing a venturi effect.

20 Claims, 22 Drawing Sheets

(56) References Cited

U.S. PATENT DOCUMENTS

2017/0172338 A1\* 6/2017 Burrows ............. A47J 31/4403
2017/0347826 A1\* 12/2017 Popa ..................... A47J 31/469

\* cited by examiner

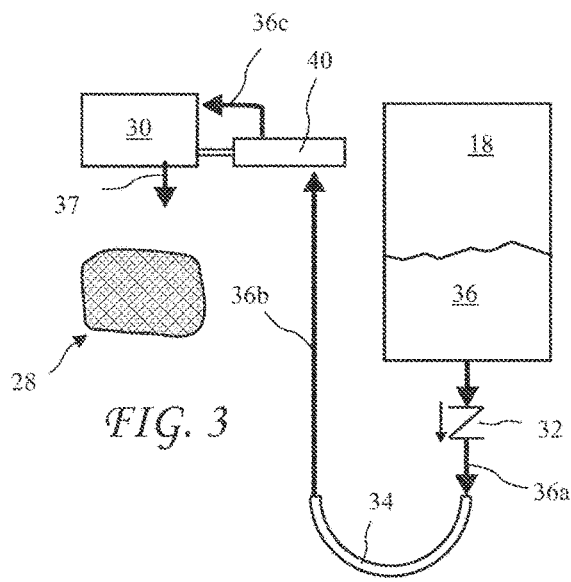
FIG. 3
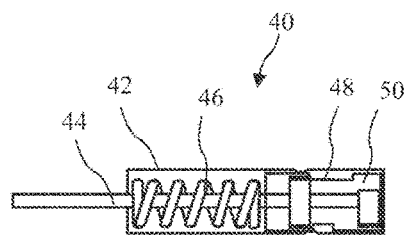
FIG. 4
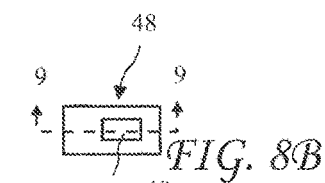
FIG. 8B
FIG. 9
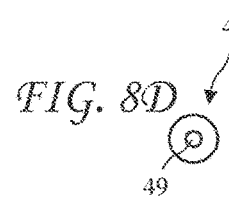
FIG. 8D
FIG. 8A
FIG. 8E
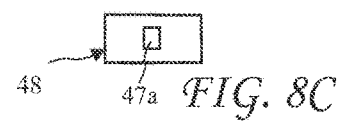
FIG. 8C
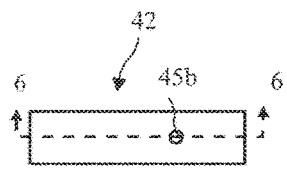
FIG. 5B
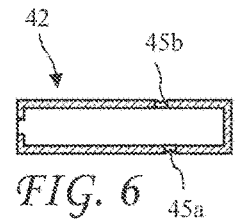
FIG. 6
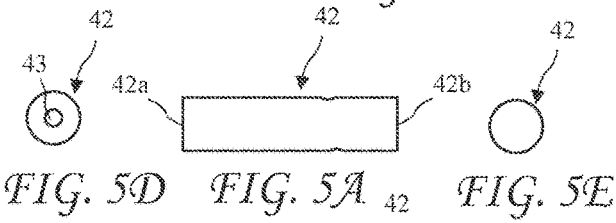
FIG. 5D   FIG. 5A   FIG. 5E
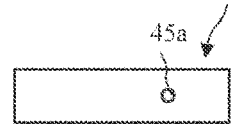
FIG. 5C
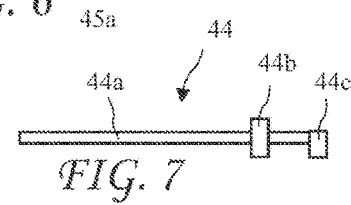
FIG. 7

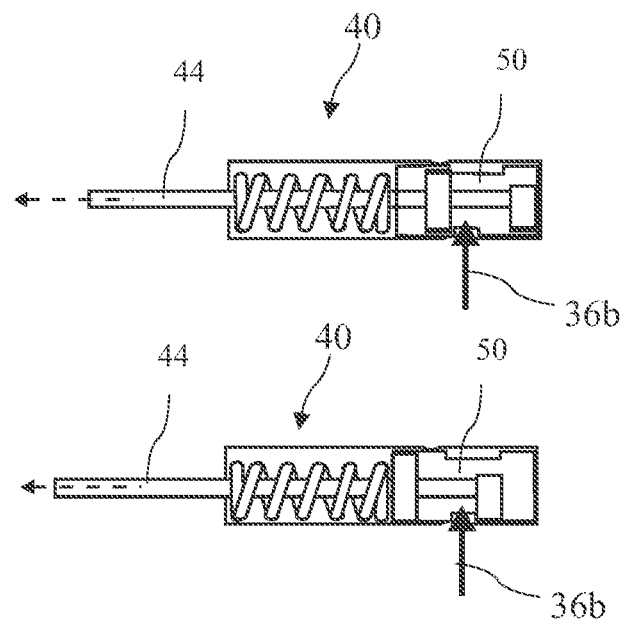
FIG. 10A
FIG. 10B
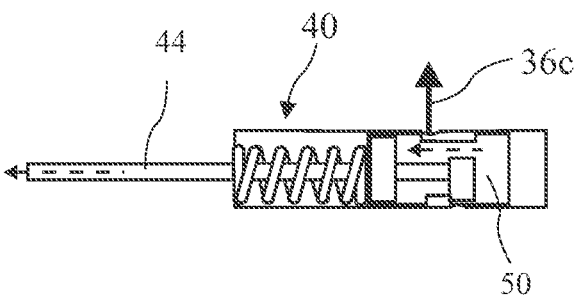
FIG. 10C
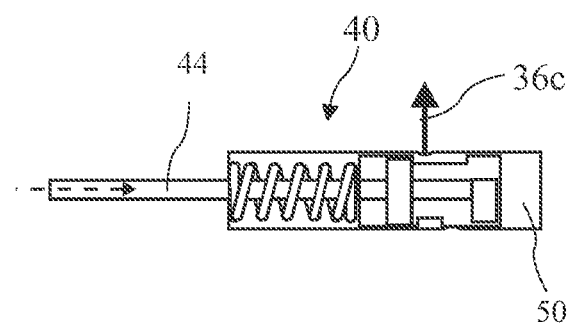
FIG. 10D
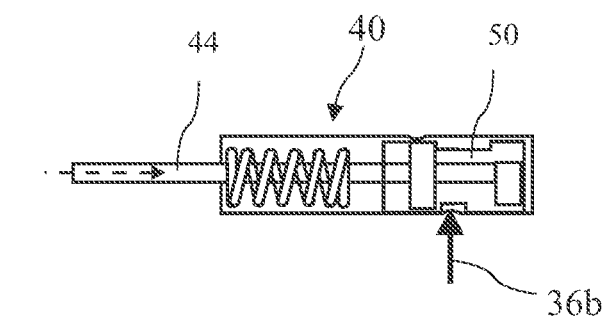
FIG. 10E

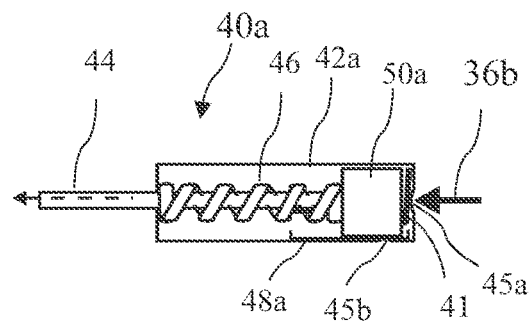
FIG. 11A
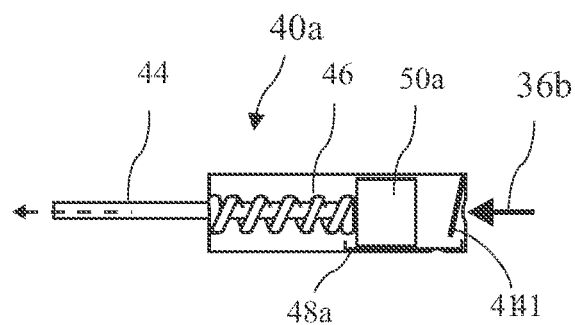
FIG. 11B
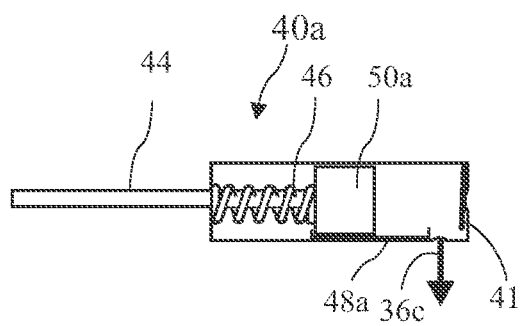
FIG. 11C
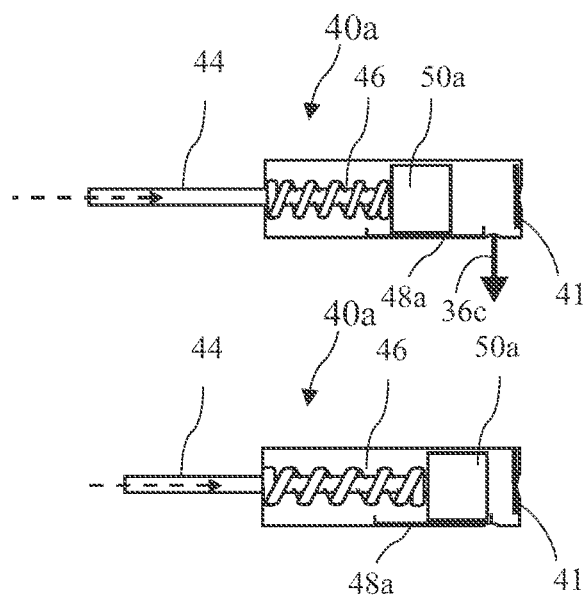
FIG. 11D
FIG. 11E

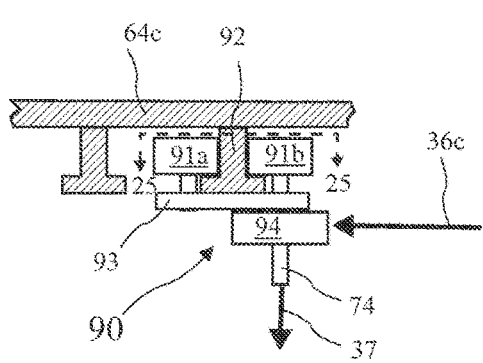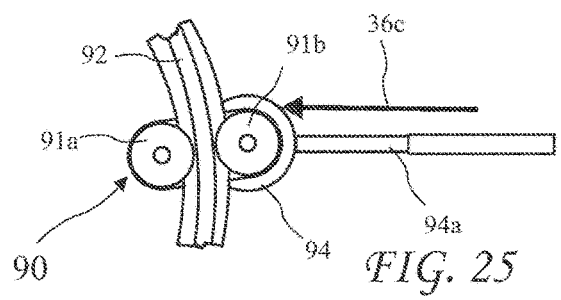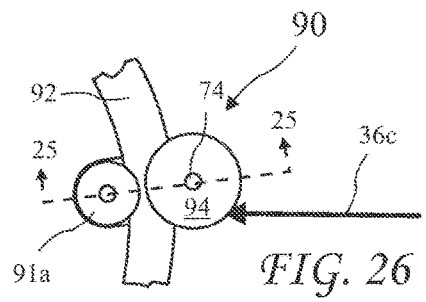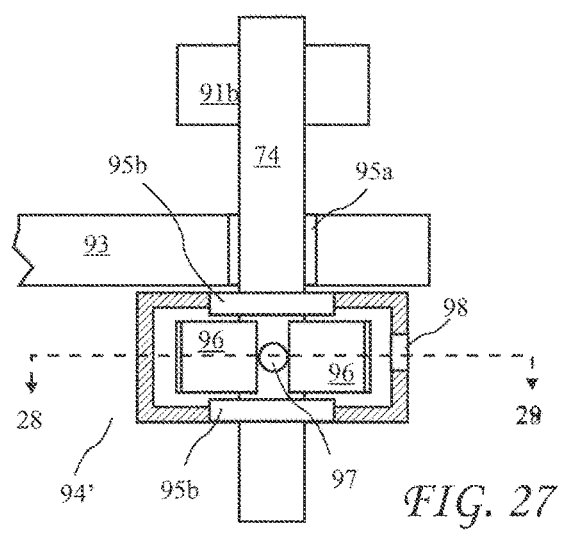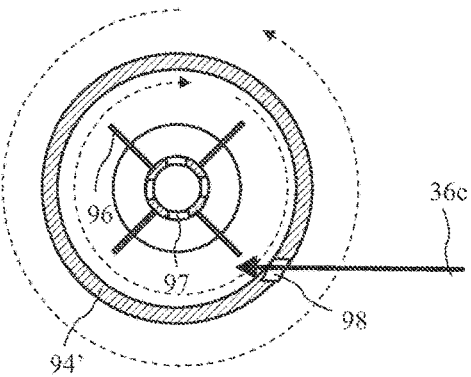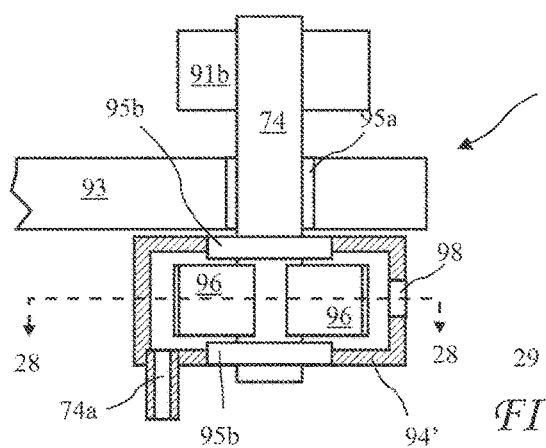

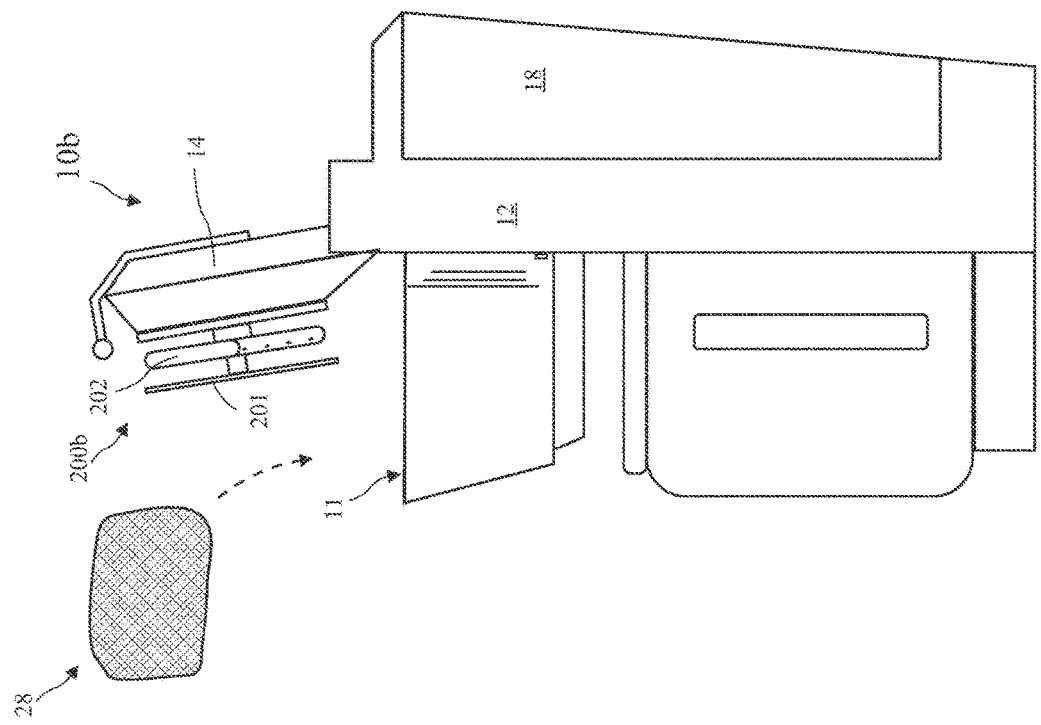
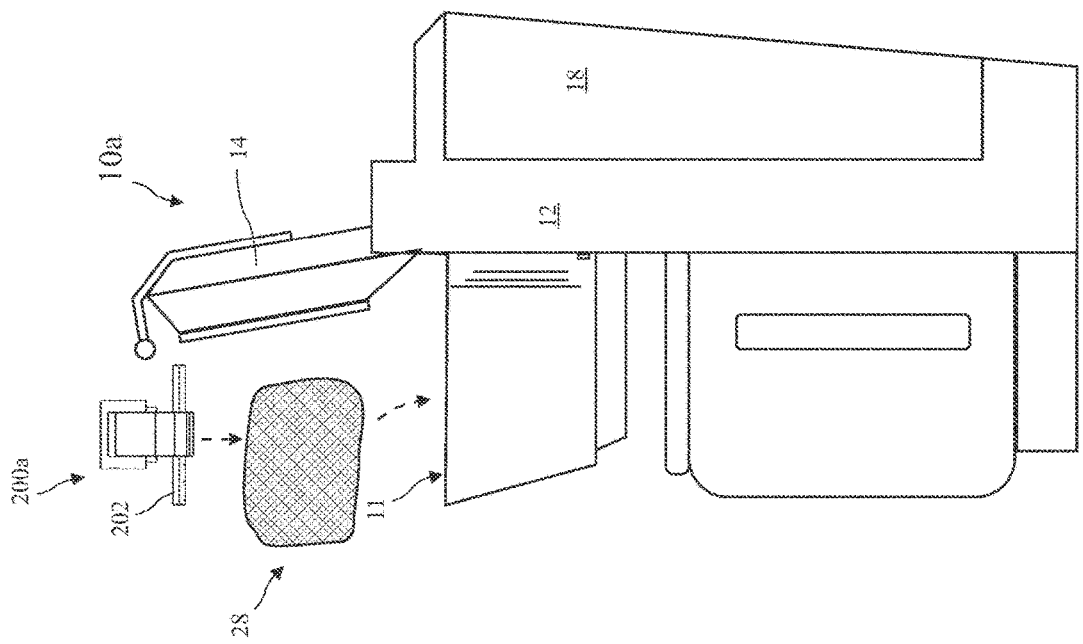

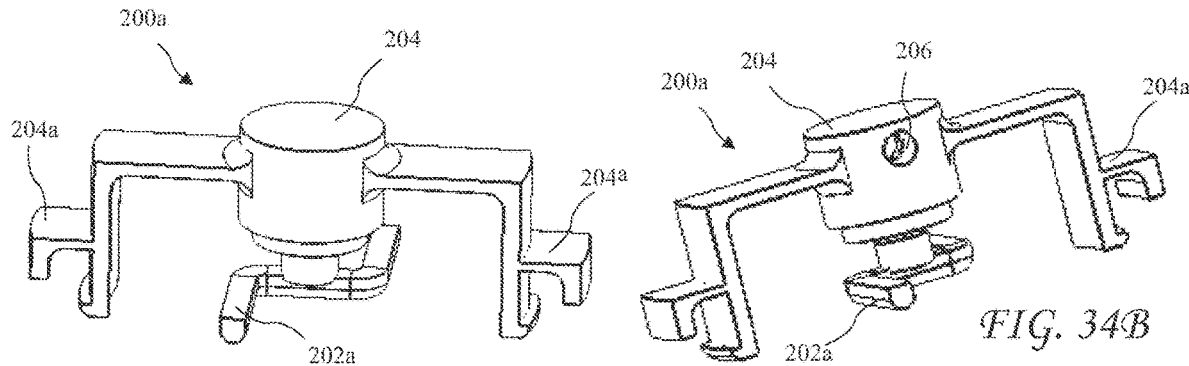
FIG. 34A
FIG. 34B
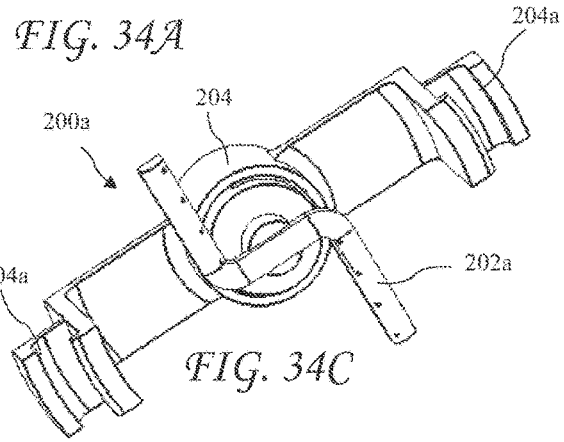
FIG. 34C
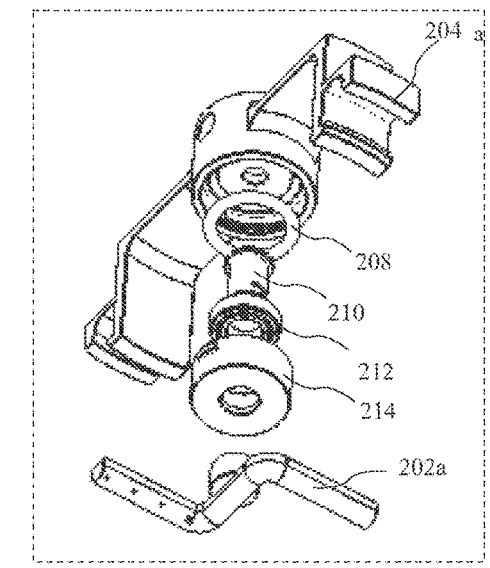
FIG. 35A
FIG. 35B

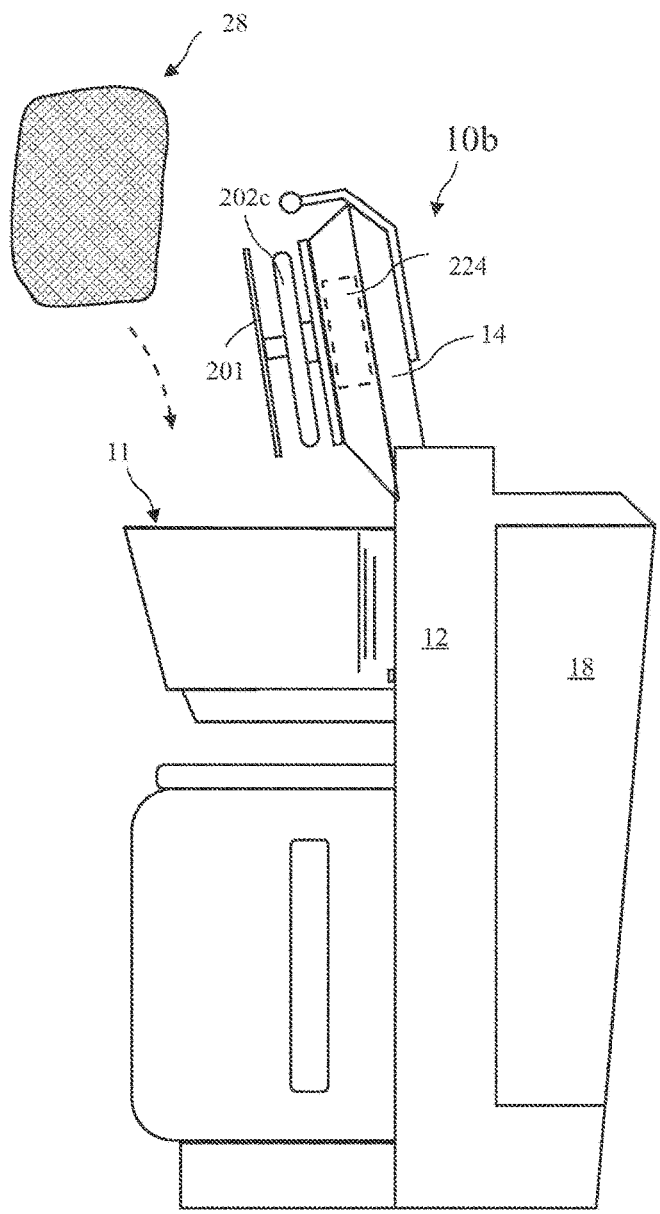
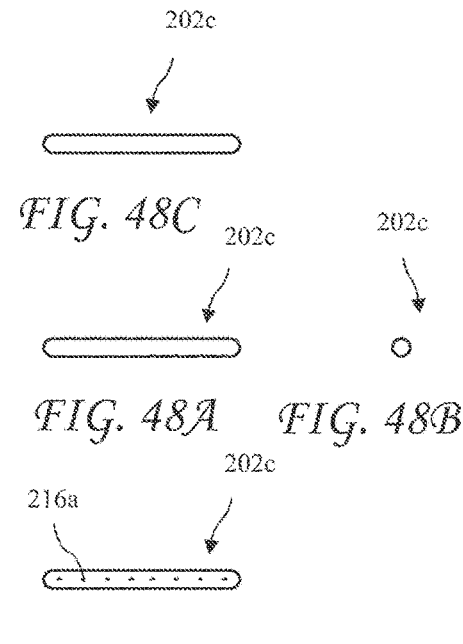
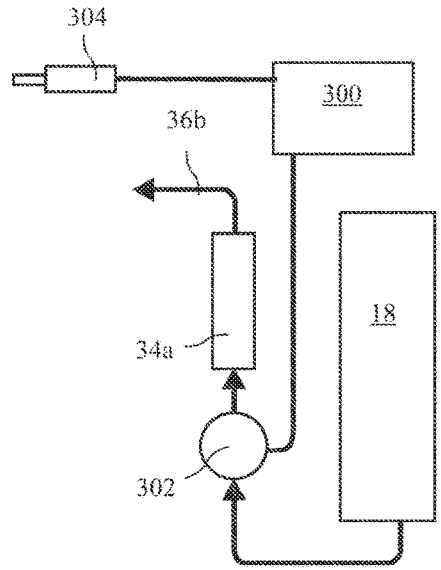
FIG. 47
FIG. 48C
FIG. 48A  FIG. 48B
FIG. 48D
FIG. 49

BEVERAGE BREWER HAVING MOVING WATER DISPERSION

CROSS-REFERENCE TO RELATED APPLICATIONS

This is a continuation-in-part of co-pending U.S. patent application Ser. No. 16/479,242, filed Jul. 19, 2019, which in turn is a 371 of International Application No. PCT/US2017/012201, which was filed on Jan. 4, 2017, which in turn claims the priority of U.S. Provisional Patent Application Ser. No. 62/275,122, filed Jan. 5, 2016, and of U.S. patent application Ser. No. 15/231,412, filed Aug. 8, 2016, the disclosures of which applications are incorporated herein in their entireties by this reference.

FIELD OF THE INVENTION

The present invention relates to beverage brewers and in particular to disbursing heated water into brewing material.

BACKGROUND OF THE INVENTION

Certain conventional drip beverage brewers include a showerhead disposed above the brewing material, having an array of ports releasing heated water into the brewing material. The water is released somewhat uniformly among the ports, and is not concentrated into any portion of the brewing material at any given time. However, only a minimal flow of water is provided at each location, and therefore the water does not significantly impact and agitate the brewing material, and ineffective brewing results.

BRIEF DESCRIPTION OF THE INVENTION

The present invention is a beverage brewer providing a controlled release of heated water into brewing material. According to an aspect of the invention, the beverage brewer includes a spiraling nozzle releasing heated water over brewing material held in the beverage brewer. The nozzle provides a single release point at each instant, providing improved exposure of the brewing material to the heated water. According to another aspect of the invention, the beverage brewer includes a rotating sprinkler arm releasing heated water into the brewing material. In any case, motion can be provided by the flow of heated water, or by an electric motor.

According to an aspect of the invention, a drip beverage brewer has a water dispersion system driven by a flow of heated water present in the beverage brewer. The flow of water cycles a piston and push rod to rotate a nozzle disk to provide a pattern of a concentrated release of water over the brewing material.

According to another aspect of the invention, a drip beverage brewer has a water dispersion system including a nozzle rotating with the nozzle disk and moving radially to provide a pattern of a concentrated release of water over the brewing material.

According to another aspect of the invention, a drip beverage brewer has a water dispersion system including a nozzle carried by a pivoting arm and moving radially to release a flow of water onto the rotating nozzle disk to provide a pattern of a concentrated release of water over the brewing material.

According to another aspect of the invention, a drip beverage brewer has a water dispersion system including a spiral guide causing radial motion of the nozzle to provide a pattern of a concentrated release of water over the brewing material.

According to another aspect of the invention, a drip beverage brewer has a rotating arm releasing the heated water into the brewing material. The arm can include angled ports providing a spray to rotate the arm, or can be motor driven and include straight ports.

According to another aspect of the invention, a drip beverage brewer has a water dispersion system including a motor to rotate the nozzle disk or the arm.

According to another aspect of the invention, a beverage brewer includes a body, a brewing material holder that is removably couplable to the body, and a movable water-dispensing member configured to receive a flow of liquid and including at least one port configured to release received liquid into the brewing material holder. The beverage brewer can also include a water-dispersing assembly positionable to be disposed above the brewing material holder and configured to receive the flow of liquid. The movable water-dispensing member can be couplable to the water-dispersing assembly to receive the flow of liquid from the water-dispersing assembly.

For example, the water-dispersing assembly can include a reservoir having an outlet. For example, the reservoir can be, or can include, a funnel. The movable water-dispensing member can be configured to move due to a force of pressure provided by the flow of liquid. For example, the movable water-dispensing member can be configured to rotate due to a force of pressure provided by the flow of liquid.

The force of pressure provided by the flow of liquid can be caused, for example, by the weight of the liquid.

The reservoir can include a constricted portion providing a venturi effect.

BRIEF DESCRIPTION OF THE DRAWINGS

The above and other aspects, features, and advantages of the present invention will be more apparent from the following more particular description thereof, presented with reference to the following drawings in which:

FIG. 3 shows elements of an exemplary embodiment of a drip beverage brewer and dispersion system according to the present invention.

FIG. 4 shows a cross-sectional view of an exemplary embodiment of a piston assembly according to the present invention.

FIG. 5A shows a side view of an exemplary embodiment of a cylinder of the piston assembly according to the present invention.

FIG. 5B shows a top view of an exemplary embodiment of a cylinder of the piston assembly according to the present invention.

FIG. 5C shows a bottom view of an exemplary embodiment of a cylinder of the piston assembly according to the present invention.

FIG. 5D shows a front view of an exemplary embodiment of a cylinder of the piston assembly according to the present invention.

FIG. 5E shows a rear view of an exemplary embodiment of a cylinder of the piston assembly according to the present invention.

FIG. 6 shows a cross-sectional view of an exemplary embodiment of a cylinder of the piston assembly according to the present invention taken along line 6-6 of FIG. 5B.

FIG. 7 shows a side view of an exemplary embodiment of a piston and rod of the piston assembly according to the present invention.

FIG. 8A shows a side view of an exemplary embodiment of a sleeve of the piston assembly according to the present invention.

FIG. 8B shows a top view of an exemplary embodiment of a sleeve of the piston assembly according to the present invention.

FIG. 8C shows a bottom view of an exemplary embodiment of a sleeve of the piston assembly according to the present invention.

FIG. 8D shows a front view of an exemplary embodiment of a sleeve of the piston assembly according to the present invention.

FIG. 8E shows a rear view of an exemplary embodiment of a sleeve of the piston assembly according to the present invention.

FIG. 9 shows a cross-sectional view of an exemplary embodiment of a sleeve of the piston assembly according to the present invention taken along line 9-9 of FIG. 8B.

FIG. 10A shows a cross-sectional view of an exemplary embodiment of a piston assembly, according to the present invention.

FIG. 10B shows a cross-sectional view of an exemplary embodiment of a piston assembly partially filed, according to the present invention.

FIG. 10C shows a cross-sectional view of an exemplary embodiment of a piston assembly completely filed, according to the present invention.

FIG. 10D shows a cross-sectional view of an exemplary embodiment of a piston assembly partially filed, according to the present invention.

FIG. 10E shows a cross-sectional view of an exemplary embodiment of a piston assembly, according to the present invention.

FIG. 11A shows a cross-sectional view of an exemplary embodiment of a piston assembly, according to the present invention.

FIG. 11B shows a cross-sectional view of an exemplary embodiment of a piston assembly partially filed, according to the present invention.

FIG. 11C shows a cross-sectional view of an exemplary embodiment of a piston assembly completely filed, according to the present invention.

FIG. 11D shows a cross-sectional view of an exemplary embodiment of a piston assembly partially filed, according to the present invention.

FIG. 11E shows a cross-sectional view of an exemplary embodiment of a piston assembly, according to the present invention.

FIG. 24 shows a side view of an exemplary embodiment of a carrier of the water dispersion assembly according to the present invention.

FIG. 25 shows a top view of an exemplary embodiment of a carrier of the water dispersion assembly according to the present invention taken along line 25-25 of FIG. 24.

FIG. 26 shows a bottom view of an exemplary embodiment of a carrier of the water dispersion assembly according to the present invention.

FIG. 27 shows a cross-sectional view of an exemplary embodiment of a water powered carrier of the water dispersion assembly according to the present invention taken along line 27-27 of FIG. 26.

FIG. 27A shows a cross-sectional view of an exemplary embodiment of a water-powered carrier of the water dispersion assembly according to the present invention taken along line 27-27 of FIG. 26 having an offset nozzle.

FIG. 28 shows a cross-sectional view of an exemplary embodiment of a carrier of the water dispersion assembly according to the present invention taken along line 28-28 of FIG. 27.

FIG. 33A shows an exemplary embodiment of a beverage brewer including water-dispersing arms according to the present invention.

FIG. 33B shows an exemplary embodiment of a beverage brewer including a baffle under the water-dispersing arms according to the present invention.

FIG. 34A shows an isometric view of an exemplary embodiment of a water-dispersing assembly including the water-dispersing arms according to the present invention.

FIG. 34B shows a second isometric view of an exemplary embodiment of a water-dispersing assembly including the water-dispersing arms according to the present invention.

FIG. 34C shows a bottom isometric view of an exemplary embodiment of a water-dispersing assembly including the water-dispersing arms according to the present invention.

FIG. 35A shows a first exploded view of an exemplary embodiment of a water-dispersing assembly including the water-dispersing arms according to the present invention.

FIG. 35B shows a second exploded view of an exemplary embodiment of a water-dispersing assembly including the water-dispersing arms according to the present invention.

FIG. 47 shows an exemplary embodiment of a beverage brewer according to the present invention.

FIG. 48A shows a side view of an exemplary embodiment of water-dispersing arms according to the present invention.

FIG. 48B shows a side view of an exemplary embodiment of water-dispersing arms according to the present invention.

FIG. 48C shows a side view of an exemplary embodiment of water-dispersing arms according to the present invention.

FIG. 48D shows a side view of an exemplary embodiment of water-dispersing arms according to the present invention.

FIG. 49 shows components of an exemplary embodiment of a non-drip beverage brewer according to the present invention.

Corresponding reference characters indicate corresponding components throughout the several views of the drawings.

DETAILED DESCRIPTION OF THE INVENTION

Figure 1C:
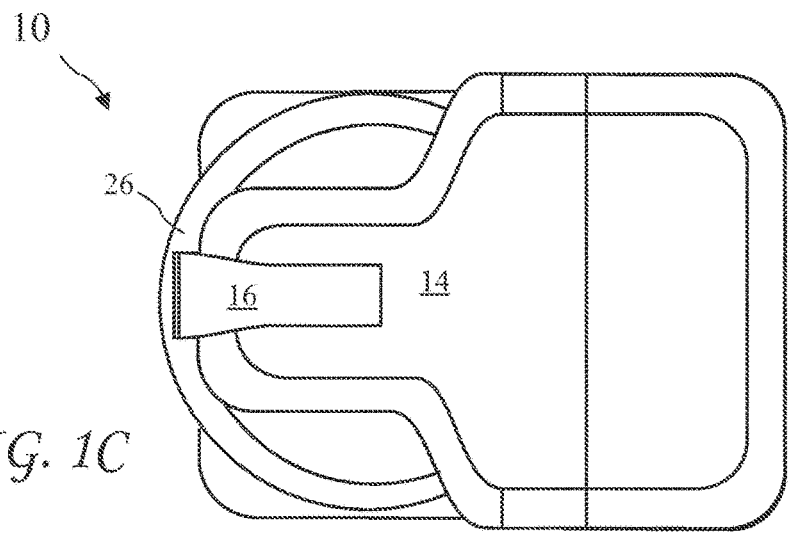
FIG. 1C is a top view of an exemplary embodiment of a beverage brewer according to the present invention.
Figure 1A:
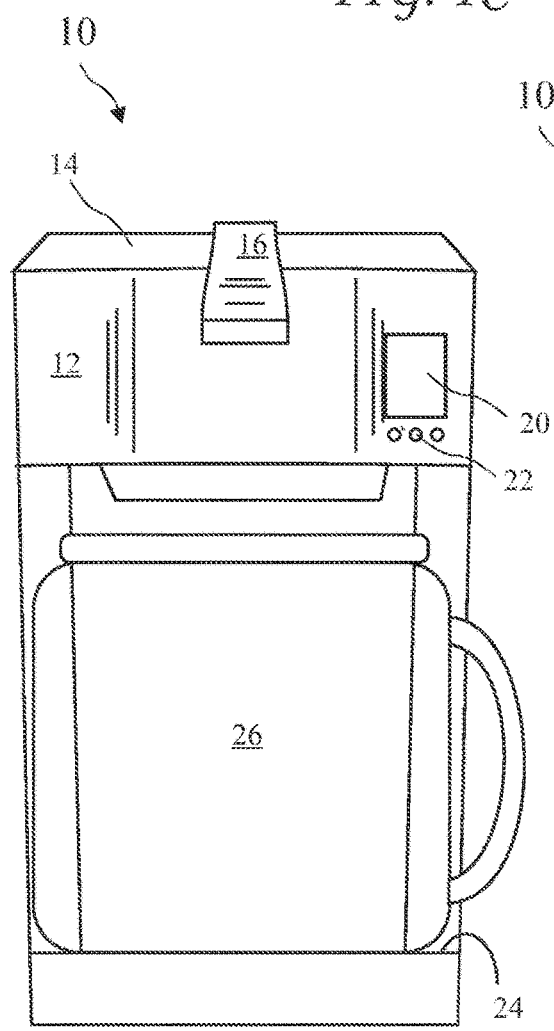
FIG. 1A is a front view of an exemplary embodiment of a beverage brewer according to the present invention.
Figure 1B:
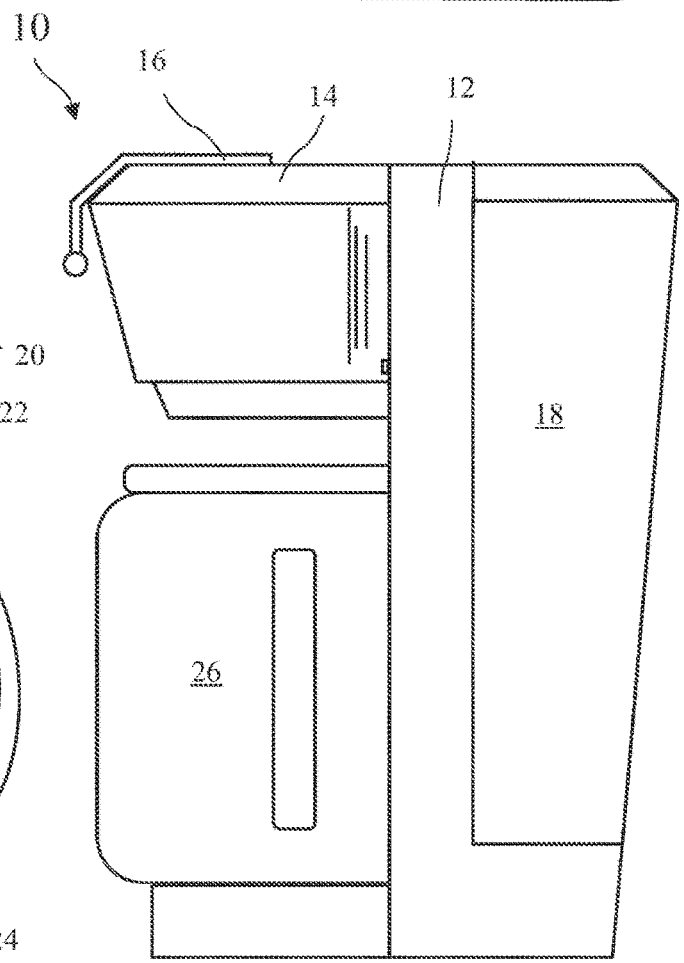
FIG. 1B is a side view of an exemplary embodiment of a beverage brewer according to the present invention.

With reference to FIGS. 1A-C, a beverage brewer 10 includes a body 12, a beverage brewer lid 14, a lid handle 16, a water container 18, a display 20, controls 22, and a platform 24. A beverage pitcher 26 is shown arranged on the platform 24. The beverage brewer 10 provides a flow of hot water through brewing material to produce a brewed beverage. The water can be heated by one of any known means, for example, an electrical heating coil, a conductive coating on tubing carrying the water, or inductive heating.

Figure 2:
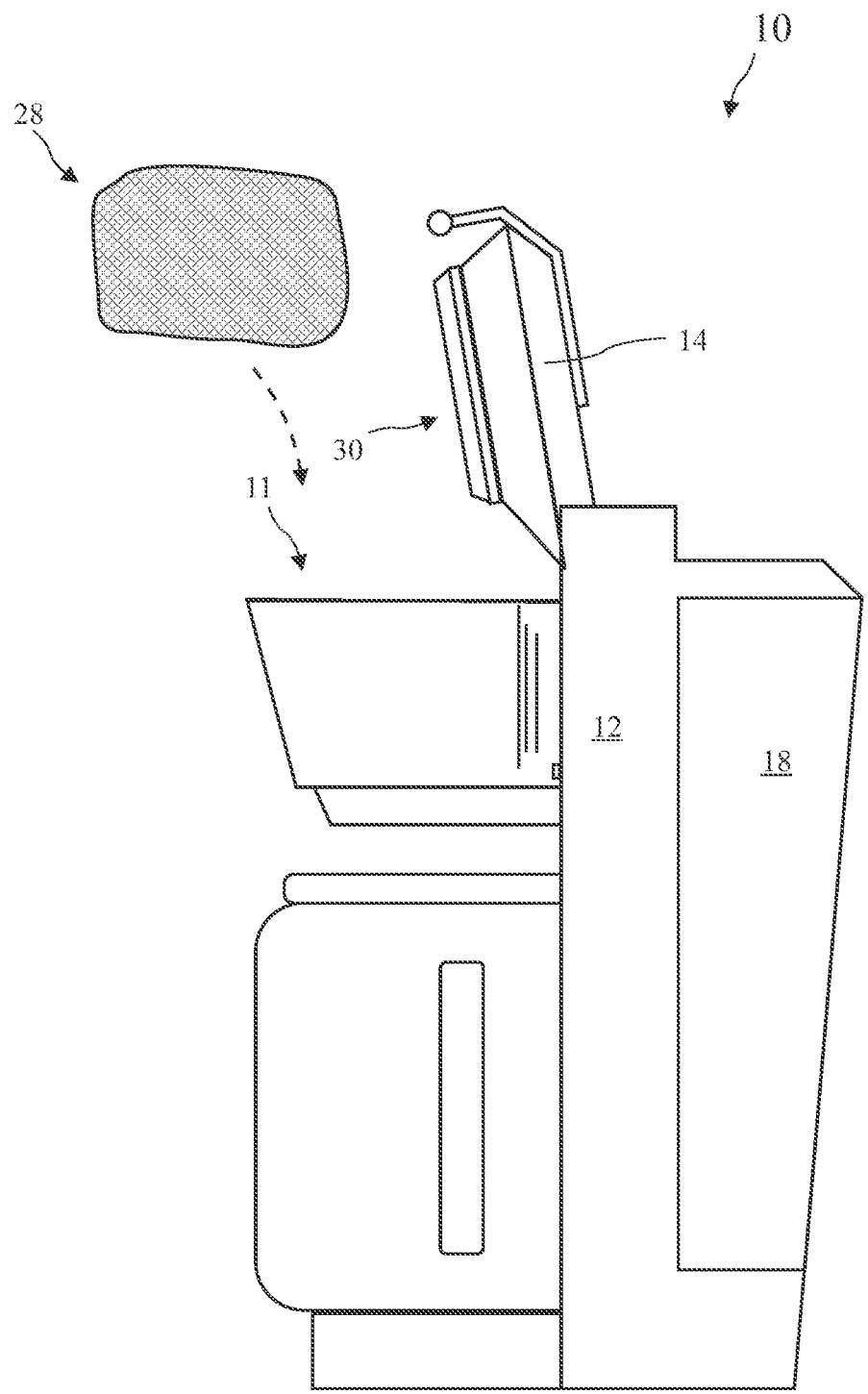
FIG. 2 is a side view of an exemplary embodiment of a beverage brewer with an open lid allowing placement of a brewing material holder according to the present invention inside the beverage brewer.

A side view of the beverage brewer 10 with the lid 14 open, allowing placement of brewing material inside a brewing chamber 11 of the beverage brewer 10, is shown in FIG. 2. A water dispersion assembly 30 is arranged on the bottom of the lid 14, configured to provide a flow of heated water 37 (see FIG. 3) into the brewing material 28.

Elements of a drip beverage brewer and the dispersion assembly 30 are shown in FIG. 3. The drip beverage brewer includes the water container 18 configured to hold water 36, a check valve 32 configured to control a flow of water 36a from the container 18, a heating element 34 configured to heat the water 36a to create a pulsating heated flow of water 36b, a piston assembly 40 configured to receive the heated flow of water 36b and to release a second flow of heated water 36c, and the water dispersion assembly 30 configured to receive the second flow of heated water 36c and to provide a directed flow of heated water to the brewing material 28.

A cross-sectional view of the piston assembly 40 is shown in FIG. 4. The piston assembly 40 includes a cylinder 42, a piston/rod 44 configured to slide inside the cylinder 42, a spring 46 configured to bias the piston/rod 44 away from the dispersion assembly 30, a volume 50 between the piston/rod 44 and the far end of the cylinder 42, and a sleeve valve 48 configured to slide back and forth in the volume 50. The volume 50 increases as the piston/rod 44 moves toward the dispersion assembly 30, and decreases as the piston/rod 44 moves away from the dispersion assembly 30. The rod 44 is preferably a reciprocating rod engaging an off-center feature of the water dispensing assembly 30 to rotate at least part of the water dispensing assembly (see FIG. 12B).

A side view of the cylinder 42 of the piston assembly 40 is shown in FIG. 5A, a top view of the cylinder 42 is shown in FIG. 5B, a bottom view of the cylinder 42 is shown in FIG. 5C, a front view of the cylinder 42 is shown in FIG. 5D, a rear view of the cylinder 42 is shown in FIG. 5E, and a cross-sectional view of the cylinder 42 taken along line 6-6 of FIG. 5B is shown in FIG. 6. The cylinder 42 has a mostly closed front 42a with a passage 43 for the piston/rod 44, which can include a seal, and has a closed rear 42b. An inlet port 45a receives the flow of heated water 36b, and an outlet port 45b releases the second flow of heated water 36c.

A side view of a piston/rod 44 of the piston assembly 40 is shown in FIG. 7. The piston/rod 44 includes a rod portion 44a, a piston portion 44b, and a sleeve engaging portion 44c.

A side view of the sleeve valve 48 of the piston assembly 40 is shown in FIG. 8A, a top view of the sleeve valve 48 is shown in FIG. 8B, a bottom view of the sleeve valve 48 is shown in FIG. 8C, a front view of the sleeve valve 48 is shown in FIG. 8D, a rear view of the sleeve valve 48 is shown in FIG. 8E, and a cross-sectional view of the sleeve valve 48 taken along line 9-9 of FIG. 8B is shown in FIG. 9. The sleeve valve 48 includes a mostly closed front 48a having a passage 49 for the rod portion 44a of the piston/rod 44, an open rear 48b, and intrusions 48c configured to cooperate with the piston portion 44b and the sleeve engaging portion 44c of the piston/rod 44. An inlet window 47a aligns with the inlet port 45a to allow entry of the flow of heated water 36b into the piston assembly 40, and an outlet window aligns with the outlet port 45b to release the second flow of heated water 36c from the piston assembly 40.

A cross-sectional view of the piston assembly 40 with the piston/rod 44 away from the dispersion assembly 30 is shown in FIG. 10A, a cross-sectional view of the piston assembly 40 partially filed and with the piston/rod 44 moving partially toward the dispersion assembly 30 is shown in FIG. 10B, a cross-sectional view of the piston assembly 40 completely filled and with the piston/rod 44 toward the dispersion assembly 30 is shown in FIG. 10C, a cross-sectional view of the piston assembly 40 partially filled and with the piston/rod 44 moving partially away from the dispersion assembly 30 is shown in FIG. 10D, and a cross-sectional view of the piston assembly 40 with the piston/rod 44 back away from the dispersion assembly 30 is shown in FIG. 10E. When the piston/rod 44 is fully away from the dispersion assembly 30, the inlet port 45a is aligned with the inlet window 47a, and the flow of heated water 36b enters the interior 50 of the piston assembly 40, pushing the piston and rod 42 toward the dispersion assembly 30.

When the piston and rod 42 move sufficiently toward the dispersion assembly 30, the sleeve engaging portion 44c contacts the intrusions 48c and further movement of the piston and rod 42 toward the dispersion assembly 30 pushes the sleeve valve 48 toward the dispersion assembly 30, dis-aligning the inlet port 45a from the inlet window 47a and aligning the outlet port 45b with the outlet window 47b, halting the flow of heated water 36b into the piston assembly 40 and initiating the second flow of heated water 36c from the piston assembly 40. The spring 46 then pushes the piston/rod 44 back away from the dispersion assembly 30 while the second flow of heated water 36c continues to be released from the piston assembly 40. At the end of the motion away from the dispersion assembly 30 of the piston and rod 42, the piston portion 44b engages the intrusions 48c to push the sleeve valve 48 back away from the dispersion assembly 30 to realign the inlet port 45a with the inlet window 45a and dis-aligning the outlet port 45b with the outlet window 47b to reinitiate the flow of heated water 36b into the piston assembly, and the cycle repeats.

A cross-sectional view of a simpler piston assembly 40a with the piston 50a and rod 44 away from the dispersion assembly 30 is shown in FIG. 11A. The second flow of heated water 36b enters the cylinder 42a through inlet ports 45a in the right end of the cylinder 42a, driving the piston 50a and rod 44 toward the dispersion assembly 30 and compressing the spring 46. A flap valve 41 allows the flow 36b into the cylinder 42a and a sliding valve 48a blocks the flow 36c from the cylinder 42.

A cross-sectional view of the piston assembly 40a partially filled and with the piston and rod moving partially toward the dispersion assembly 30 is shown in FIG. 11B. The cylinder is filling with the second flow of heated water 36b through inlet port 45a, continuing to drive the piston 50a and rod 44 to the left. The flap valve 41 continues to allow the flow 36b into the cylinder 42a and the sliding valve 48a continues to block the flow 36c from the cylinder 42a.

A cross-sectional view of the piston assembly 40a with the piston 50a and rod 44 farther toward the dispersion assembly 30 is shown in FIG. 11C. The second flow of heated water 36b continues to enter the cylinder 42a through the inlet port 45a, and outlet port 45b is now uncovered and the third flow of heated water 36c is releasing through the outlet port 45b. The flap valve 41 blocks the inlet port 45a and the piston 50a has moved the sliding valve 48a to allow the flow 36c from the cylinder 42a.

A cross-sectional view of the piston assembly 40a with the piston 50a and rod 44 urged away from the dispersion assembly 30 by the spring 46 is shown in FIG. 11D. The flap valve 41 continues to block the inlet port 45a and the sliding valve 48a continues to allow the flow 36c from the cylinder 42a.

A cross-sectional view of the piston assembly 40a with the piston 50a and rod 44 traveling back away from the dispersion assembly 30 is shown in FIG. 11E. The flap valve 41 continues to block the inlet port 45a and the piston 50a is moving the sliding valve 48a blocking the flow 36c from the cylinder 42a.

Figure 12A:
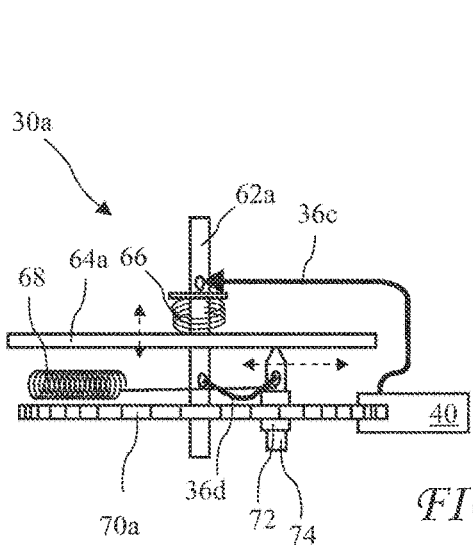
FIG. 12A shows a side view of an exemplary embodiment of a water dispersion assembly according to the present invention.
Figure 12B:
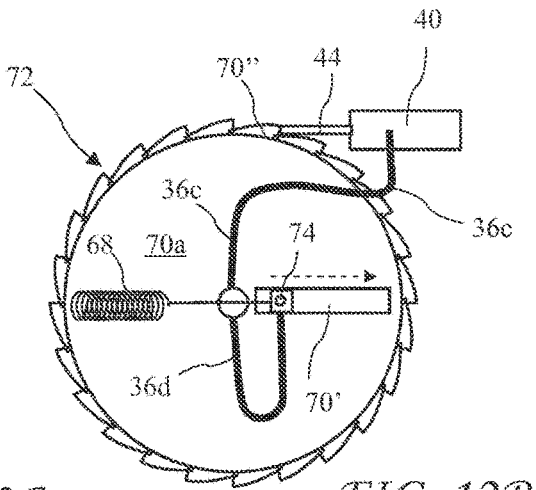
FIG. 12B is a top view of an exemplary embodiment of a distribution disk of the water dispersion assembly according to the present invention.

A side view of an exemplary water dispersion assembly 30a is shown in FIG. 12A and top view of a rotating distribution disk 70a of the water dispersion assembly 30a is shown in FIG. 12B. The water dispersion assembly 30a includes the piston assembly 40, a distribution disk assembly 72, a spindle 62a, a spiral guide 64a (see FIG. 13), and a spring 66 pressing down on the spiral guide 64a. The third flow of heated water 36c is carried from the piston assembly 40 to a non-rotating portion 62a (see FIG. 15) of the spindle 62. The distribution disk assembly 72 rotates with a rotating portion 62" of the spindle 62a and a nozzle 74 slides radially in a slot 70' in the distribution disk 70a. A spring 68 pulls the nozzle 74 toward the center of the distribution disk 70a. The nozzle 74 further engages the spiral guide 64a to slide the nozzle 62 radially outward along slot 70' as the distribution disk 70a rotates. The rod 44 of the piston assembly 40 provides rotation of the distribution disk 70a by pushing against teeth 70" on the perimeter of the distribution disk 70a. A fourth flow of heated water 36d runs from the spindle 62a to the nozzle 74.

Figures 13, 13A:
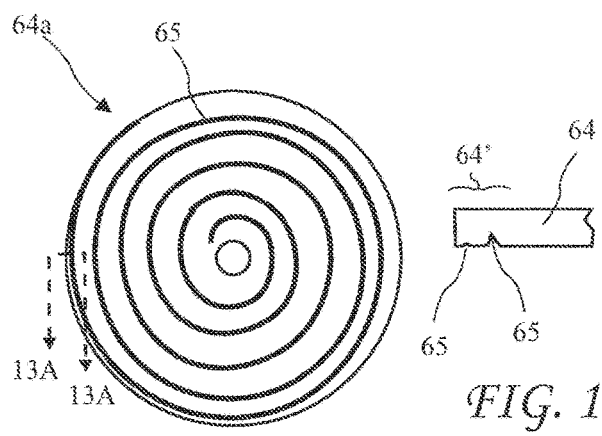
FIG. 13 shows a bottom view of an exemplary embodiment of a spiral guide of the water dispersion assembly according to the present invention.
FIG. 13A shows a partial cross-sectional view of an exemplary embodiment of an outer edge of the spiral guide according to the present invention.

A bottom view of the spiral guide 64a is shown in FIG. 13 and a cross-sectional view of an edge portion 64' of the spiral guide 64a is shown in FIG. 13A. The spiral 65 is an indentation (or groove) in the bottom of the spiral guide 64a and the groove 65 becomes more shallow toward the edge portion 64' of the spiral guide 64a. When the nozzle 74 reached the edge portion 64', the spiral guide rises, and the nozzle 74 is released and skips across the grooves 65 to return the nozzle 74 to an initial location proximal to the center of the distribution disk 70a where it starts moving out again, thus providing a concentrated distributed flow of heated water into the brewing material 28. Although a spiral guide 64a is shown biased toward the distribution disk 70a, in other embodiments the spiral guide can be fixed, and the nozzle 74 can be biased toward the spiral guide 64a.

Figure 14B:
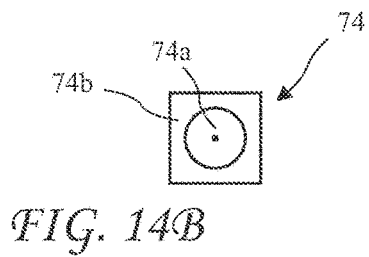
FIG. 14B is a top view of the nozzle of an exemplary embodiment of a water dispersion assembly according to the present invention.
Figure 14A:
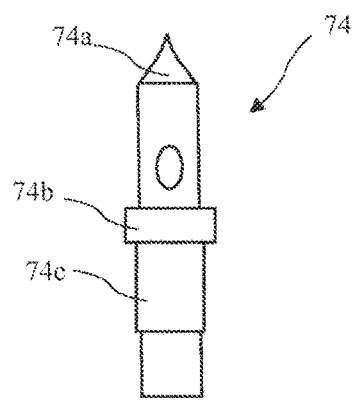
FIG. 14A is a side view of an exemplary embodiment of a nozzle of the water dispersion assembly according to the present invention.
Figure 14C:
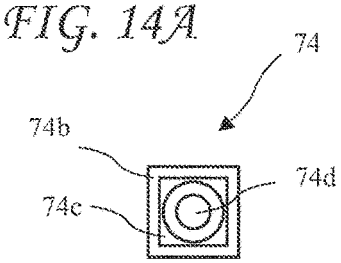
FIG. 14C is a bottom view of an exemplary embodiment of a nozzle of the water dispersion assembly according to the present invention.
Figure 16A:
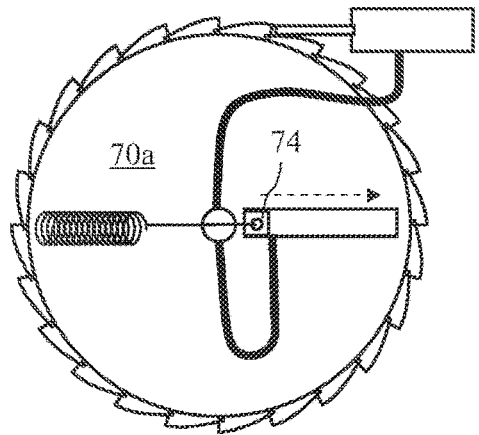
FIGS. 16A-16F show six sequential positions of an exemplary embodiment of a nozzle of the water dispersion assembly according to the present invention.
Figure 16B:
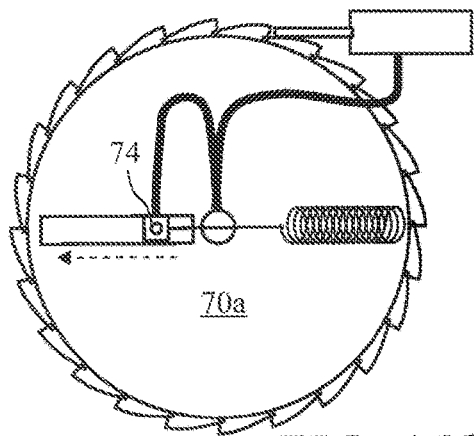
Figure 16C:
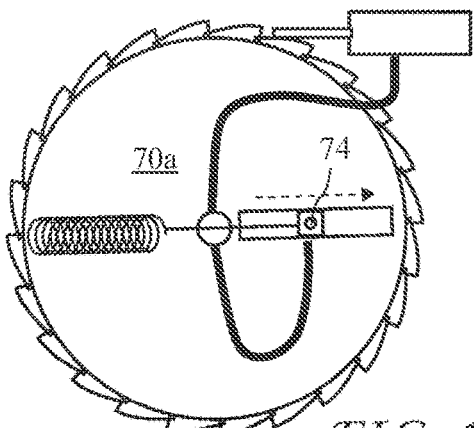
Figure 16D:
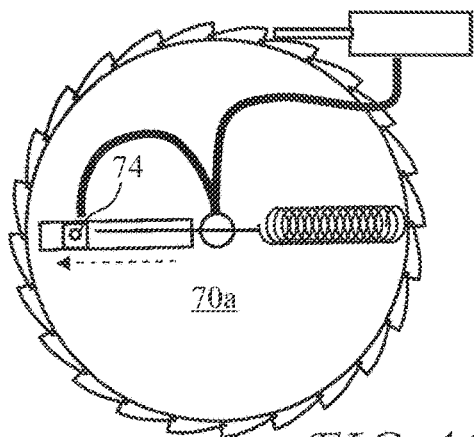
Figure 16E:
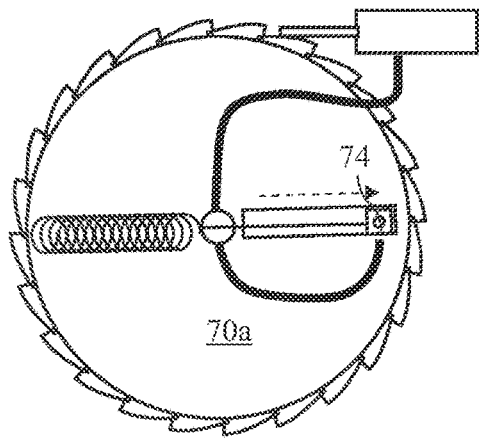
Figure 16F:
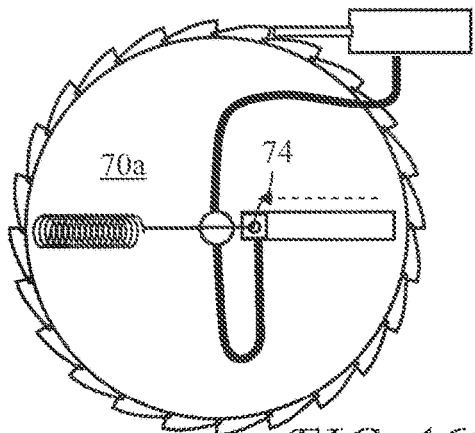

A side view of the nozzle 74 is shown in FIG. 14A, a top view of the nozzle 74 is shown in FIG. 14B, and a bottom view of the nozzle 74 is shown in FIG. 14C. The nozzle 74 includes a spiral engaging tip 74a, which can be pointed, offset, rounded, or any shape suitable to cooperate with a groove 65 and to skip across the spiral guide 64a after disengaging from the groove 65. A stop portion 74b is arranged above a guide portion 74c that slides in the slot 70'. The heated flow of water 36 is released through a port 74d in the bottom of the nozzle 74.

Figure 15:
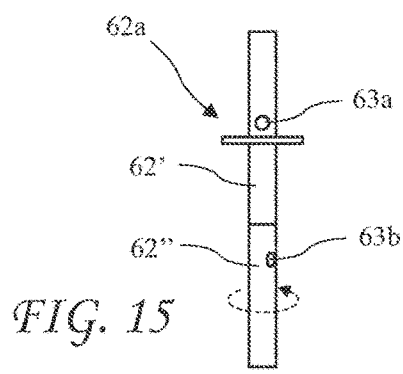
FIG. 15 shows an exemplary embodiment of a spindle of the water dispersion assembly according to the present invention.

The spindle 62a, including a fixed portion 62' and a rotating portion 62", is shown in FIG. 15. The rotating portion 62" rotates with the distribution disk 70a. The fourth flow of heated water 36d enters the spindle 62a through a stationary port 63a and is released from the spindle 62" through a rotating port 63b.

Six sequential positions of the nozzle 74 of the water dispersion assembly 30a are shown in FIGS. 16A-16F. As the distribution disk 70a rotates, the nozzle 74 moves out radially through cooperation with a spiral guide 64a. When the nozzle 74 reaches the end of the slot 70', the nozzle 74 disengages from the spiral guide 64a and returns to its initial location near the spindle 62a.

Figure 17A:
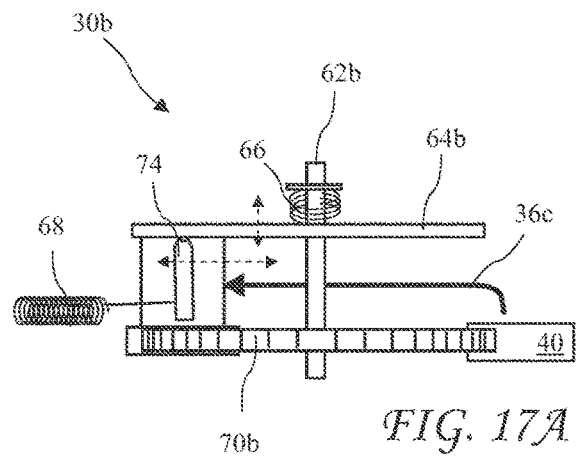
FIG. 17A shows a side view of an exemplary embodiment of a water dispersion assembly according to the present invention.
Figure 17B:
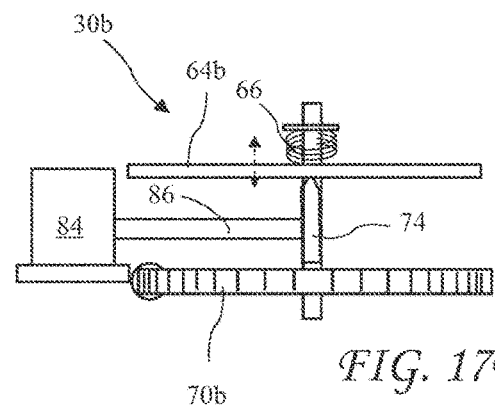
FIG. 17B shows a second side view of an exemplary embodiment of a water dispersion assembly according to the present invention.
Figure 18:
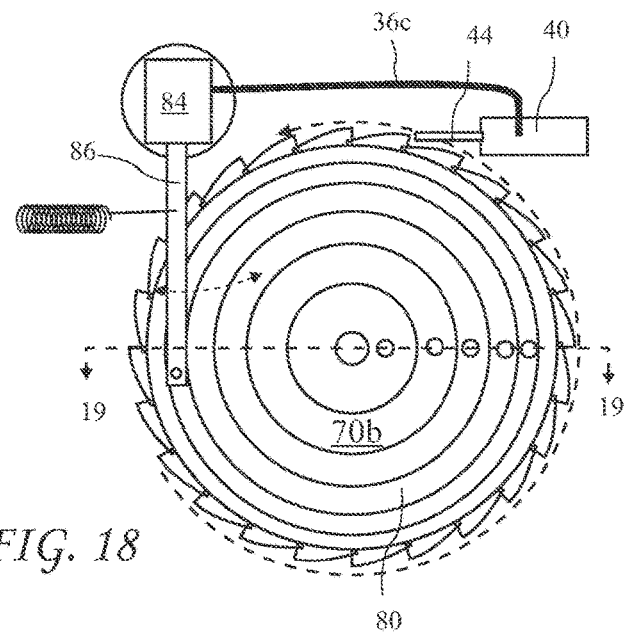
FIG. 18 is a top view of an exemplary embodiment of a distribution disk of the water dispersion assembly according to the present invention.

A side view of a water dispersion assembly 30b is shown in FIG. 17A, a second side view of the water dispersion assembly 30b is shown in FIG. 17B, and a top view of a distribution disk 70b of the water dispersion assembly 30b is shown in FIG. 18. The water dispersion assembly 30b includes an arm 86 extending from a pivot block 84. A spring 68 pulls the arm 86 outward, and a rotating spiral guide 64b guides the arm 86 inward. The spiral guide 64b is similar to the spiral guide 64a, except the inner most spiral of the spiral guide 64b reduces in depth to disengage the nozzle 74 from the spiral guide 64b to allow the spring 68 to pull the arm 86 outward, the nozzle 74 skipping over grooves 65, to return to an outside position to repeat the inward travel of the nozzle 74.

Figure 19:
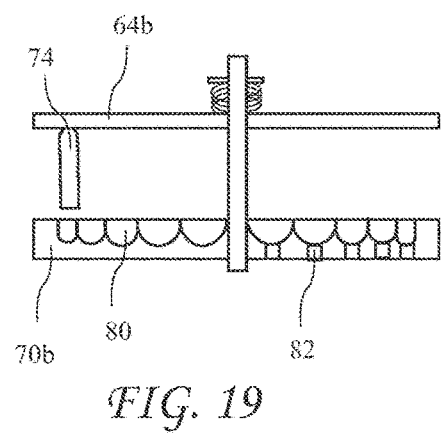
FIG. 19 is a cross-sectional view of an exemplary embodiment of a distribution disk of the water dispersion assembly according to the present invention taken along line 19-19 of FIG. 18.
Figure 20A:
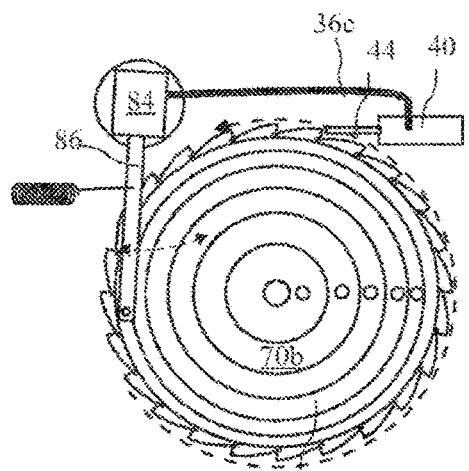
FIGS. 20A-20F show six sequential positions of an exemplary embodiment of a nozzle of the water dispersion assembly according to the present invention.
Figure 20B:
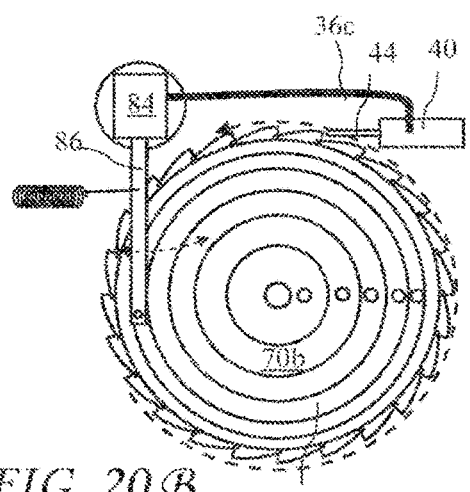
Figure 20C:
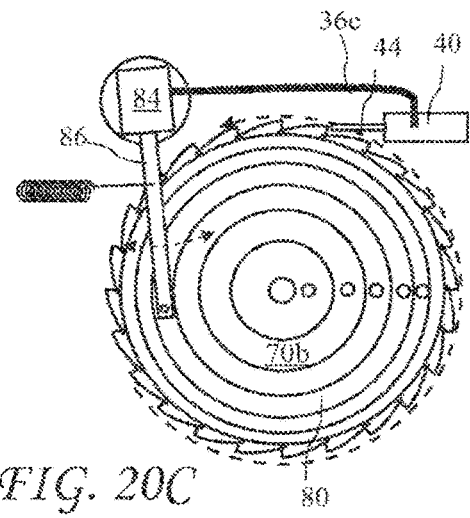
Figure 20D:
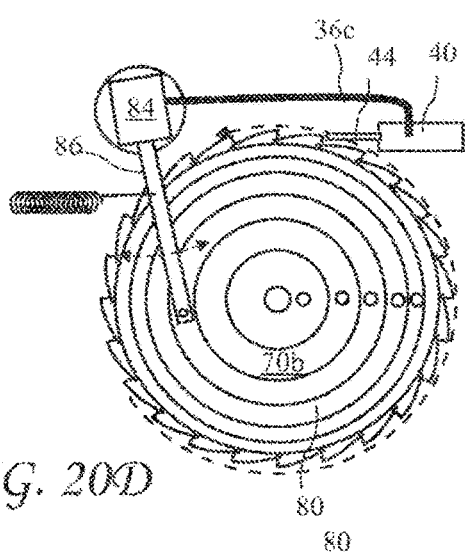
Figure 20E:
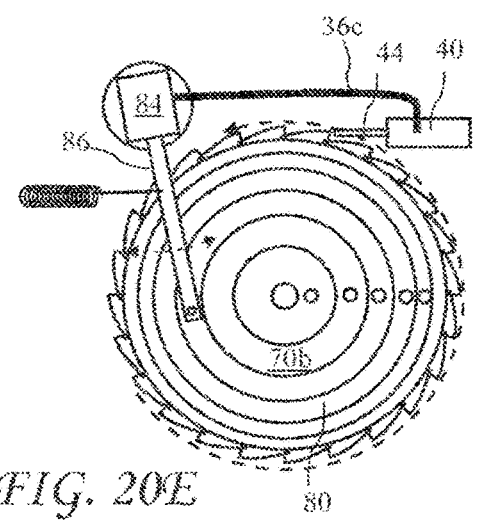
Figure 20F:
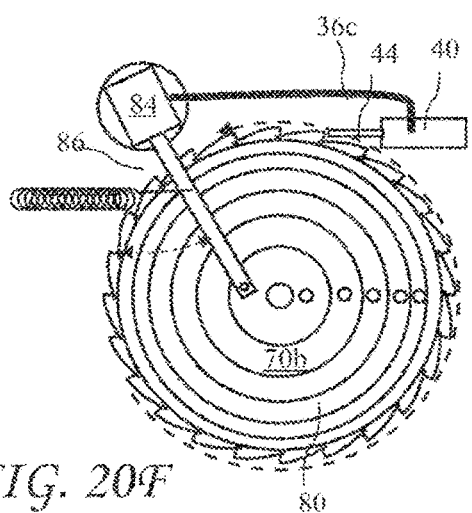

A cross-sectional view of the distribution disk 70b taken along line 19-19 of FIG. 18, is shown in FIG. 19. The distribution disk 70b includes concentric troughs 80 having passages 82 to release heated water from the distribution disk 70b into the brewing material 28. Each trough 80 is sequentially filled with heated water as the arm 86 pivots inward. The heated water is distributed angularly by rotation of the distribution disk 70b caused by the piston assembly 40.

Six sequential positions of the nozzle of the water dispersion assembly 30b are shown in FIGS. 20A-20F. As the arm 86 is caused to pivot by the spiral guide 64b, the nozzle 74 sequentially fills the troughs, from the outermost trough, to the innermost trough, and then repeats.

Figure 21:
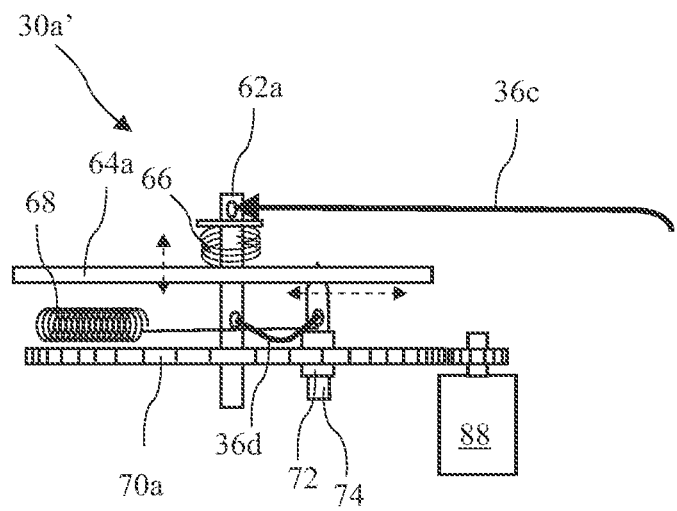
FIG. 21 shows an exemplary embodiment of a dispersion assembly with rotation provided by a motor, according to the present invention.
Figure 22:
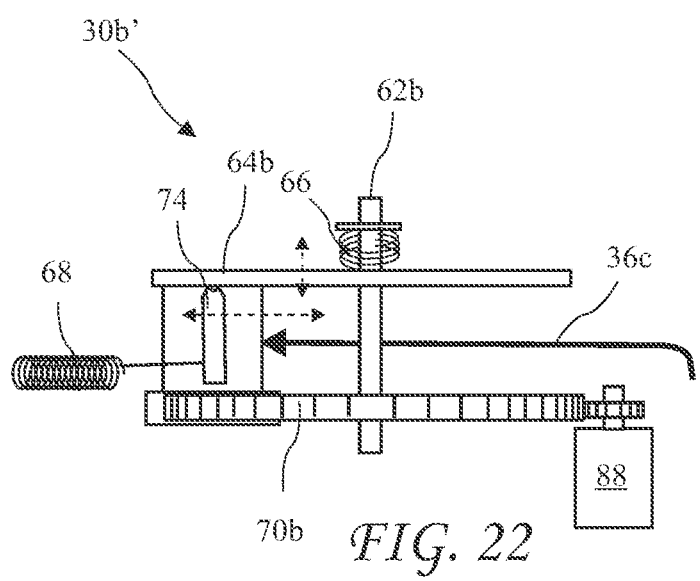
FIG. 22 shows an exemplary embodiment of a dispersion assembly with rotation provided by a motor, according to the present invention.

An embodiment of the dispersion assembly 30a' with rotation provided by a motor 88 is shown in FIG. 21, and an embodiment of the dispersion assembly 30b' with rotation provided by the motor 88 is shown in FIG. 22. The motor 88 replaces the piston assembly 40, and the flow of heated water can be provided from a drip beverage brewer, or from a beverage brewer having a pump to circulate the flow of heated water.

Figure 23A:
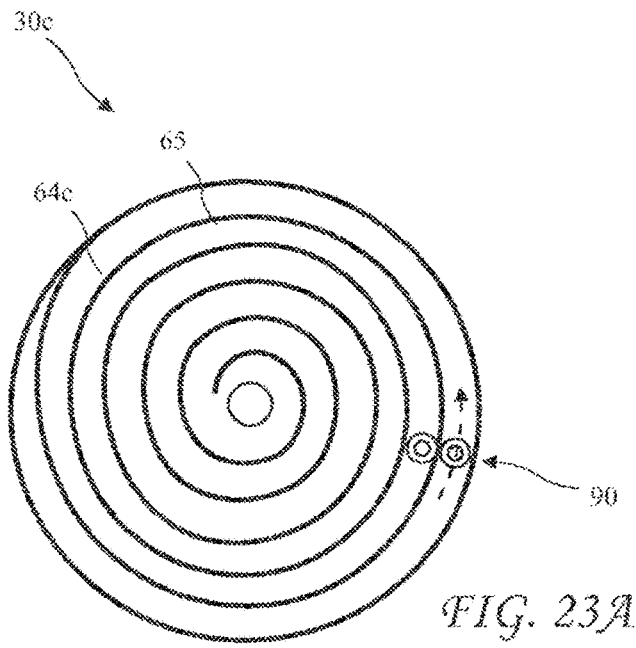
FIGS. 23A-23C show an exemplary embodiment of a water dispersion assembly according to the present invention.
Figure 23B:
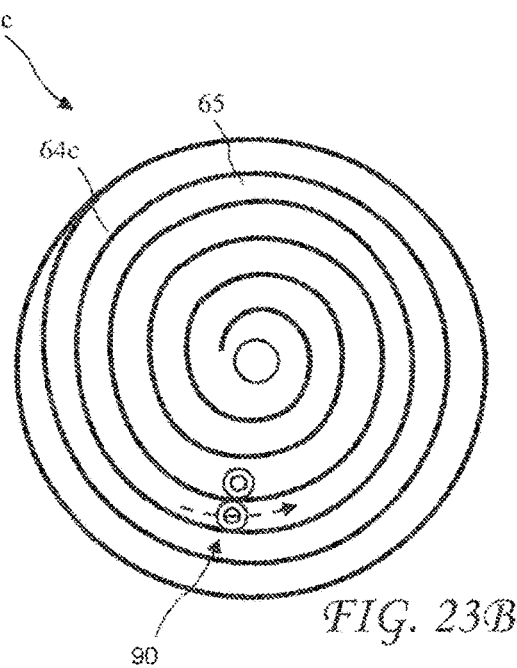
Figure 23C:
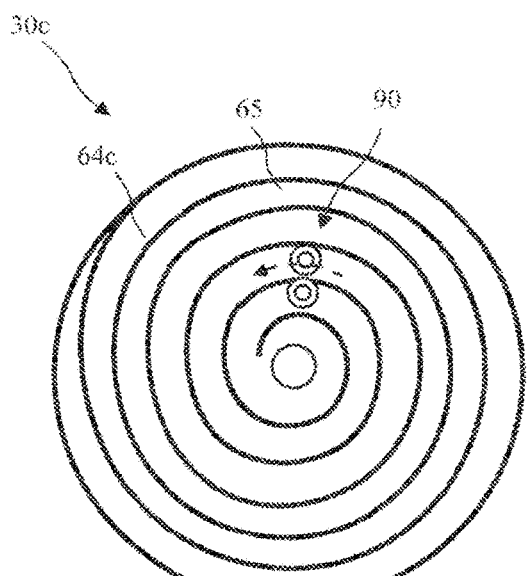

Motion of a water dispersion assembly 30c is shown in FIGS. 23A-23C as a carrier 90 is shown traveling along a rail 92 of a spiral guide 64c. A side view of the carrier 90 is shown in FIG. 24, a top view of the carrier 90 taken along line 25-25 of FIG. 24 is shown in FIG. 25, and a bottom view of the carrier 90 is shown in FIG. 26. The carrier 90 includes an idler roller 91a and driven roller 91b sandwiching an inverted "T" rail 92. The driver roller 91b is driven by a motor assembly 94 rotationally attached to the nozzle 74. The motor assembly 94 receives the third flow of heated water 36c and can be a water-driven motor (see FIGS. 27 and 28) or can be an electric motor 100 receiving electrical power through conductors 99 (see FIG. 29). The motor assembly 94 can be rotationally constrained by a water line carrying the third flow of heated water 36c to the motor assembly 94, or by a telescoping arm 94a, or can otherwise be rotationally constrained to allow only some rotation of the motor assembly 94 as the carrier 90 travels along the spiral guide 30c.

A cross-sectional view of a water-driven carrier 90 taken along line 27-27 of FIG. 26 is shown in FIG. 27, and a cross-sectional view of the water-driven carrier 90 taken along line 28-28 of FIG. 27 is shown in FIG. 28. The water-driven carrier 90 includes a bearing 95a that allows a motor case 94' to pivot on the nozzle 74, and a bearing 95a that allows the nozzle 74 to rotate in a guide plate 93 and to rotate the driven roller 91b. The idler roller 91a freely rotates on a vertical shaft fixed to the guide plate 93. The third flow of heated water 36c tangentially enters the motor case 94' through a port 98 and cooperates with fins 96 attached to the nozzle 74 to rotate the nozzle 74 and thus also rotate the driven roller 91*b*, causing the carrier 90 to travel along the rail 92. Ports 97 in the nozzle 74 receive the third flow of heated water 36*c* and the nozzle 74 releases the flow of heated water 37 (see FIG. 3) into the brewing material 28.

A cross-sectional view of a water-driven carrier 90*a* having an offset nozzle 74*a*, taken along line 27-27 of FIG. 26, is shown in FIG. 27A. The offset nozzle 74*a* is arranged generally opposite to the port 98 and can provide a stronger flow of water out of the motor case 94'.

Figure 29:
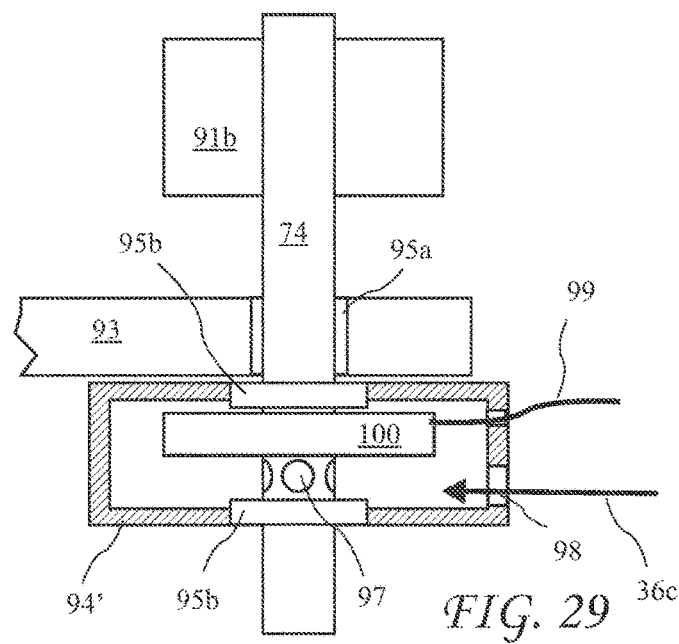
FIG. 29 shows a cross-sectional view of an exemplary embodiment of an electric powered carrier of the water dispersion assembly according to the present invention taken along line 27-27 of FIG. 26.

A cross-sectional view of an electric-powered carrier 90 taken along line 27-27 of FIG. 26 is shown in FIG. 29. Electrical conductors 99 run parallel to the third flow of heated water 36*c*, and into the motor case 94' to an electric motor 100. The electric motor 100 is constrained from free rotation within the case 94' and rotates the nozzle 74 with respect to the case 94'. The electric-powered carrier 90 is otherwise similar to the water-powered carrier 90.

Figure 30:
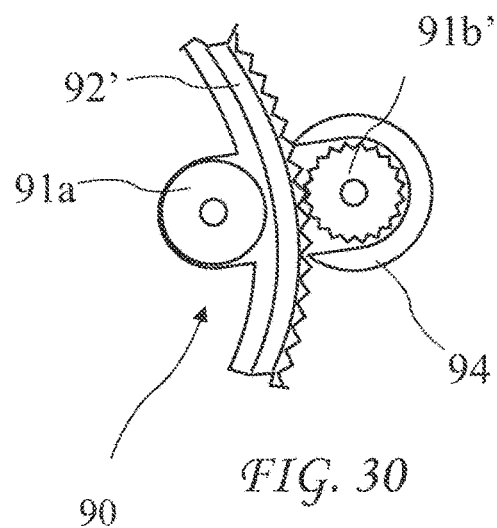
FIG. 30 shows an exemplary embodiment of a drive roller and rail having engaging teeth according to the present invention.

A toothed drive gear 91*b*' and toothed rail 92', of the water dispersion assembly 30*c*, having engaging teeth are shown in FIG. 30. The teeth provide improved engagement of the drive gear 91*b*' and rail 92'.

Figure 31:
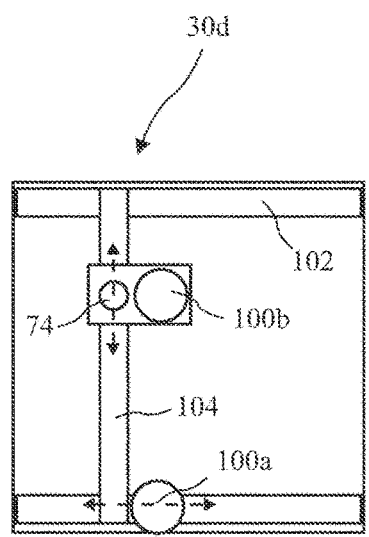
FIG. 31 shows an exemplary embodiment of a water dispersion assembly including an X-Y positioned nozzle according to the present invention.

A water dispersion assembly 30*d* including an X-Y positioned nozzle is shown in FIG. 31. A first motor 100*a* positions a horizontal rail 104 on lateral rails 102, and a second motor 100*b* positions the nozzle 74 laterally on the horizontal rail 104. The motors 100*a* and 100*b* are microprocessor controlled to position the nozzle 74 to disburse the flow of heated water into brewing material.

Figure 32:
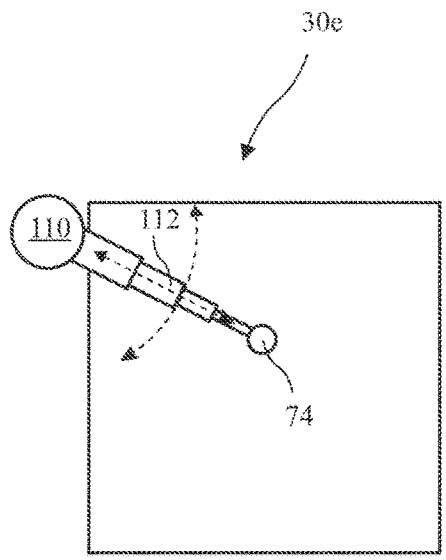
FIG. 32 shows an exemplary embodiment of a water dispersion assembly including an R theta positioned nozzle according to the present invention.

A water dispersion assembly 30*e* including an R theta positioned nozzle 74 is shown in FIG. 32. A telescoping arm 112 is motor-driven to position the nozzle 74 radially and a pivot 110 is motor-driven to position the nozzle 74 angularly. The telescoping arm 112 and pivot 110 are microprocessor controlled to position the nozzle 74 to disburse the flow of heated water into brewing material.

A beverage brewer 10*a* according to the present invention and including a water-dispersing assembly 200*a* is shown in FIG. 33A. The water-dispersing assembly 200*a* is attached over the brewing chamber 11 after the brewing material 28 is deposited into the brewing chamber 11. Arms 202 are attached to the water-dispersing assembly 200*a* to disperse water into the brewing material 28 during brewing.

A beverage brewer 10*b* according to the present invention and including a water-dispersing assembly 200*b* attached to the beverage brewer lid 14 is shown in FIG. 33B. Arms 202 are attached to the water-dispersing assembly 200*b* to disperse water into the brewing material 28 during brewing. The water-dispersing assembly 200*b* can include a baffle 201 arranged under the arms 202 to separate the arms 202 from the brewing material 28.

An isometric view of the water-dispersing assembly 200*a* is shown in FIG. 34A, a second isometric view of the water-dispersing assembly 200*a* is shown in FIG. 34B, and a bottom isometric view of the water-dispersing assembly 200*a* is shown in FIG. 34C. The water-dispersing assembly 200*a* includes an attachment bridge 204 configured to attach the beverage brewer 10 and water-dispersing arms 202*a*. The attachment bridge 204 includes clips 204*a* to engage the beverage brewer 10.

FIG. 35A shows a first exploded view of the water-dispersing assembly 200*a* and FIG. 35B shows a second exploded view of the water-dispersing assembly 200*a*. The water-dispersing assembly 200*a* includes the attachment bridge 204, an O-ring 208, a locking shaft 210, a sealed bearing 212, a bearing connector 214, and the water-dispersing arms 202*a*. The bearing connector 214 includes external tabs 214' that engage internal slots 204' in the attachment bridge 204, and the water-dispersing arms 202*a* include internal tabs 202' that engage external slots 210' in the locking shaft 210, to assemble the water-dispersing assembly 200*a*. The tabs and slots allow the water-dispersing assembly 200*a* to be easily disassembled for cleaning.

Figure 37:
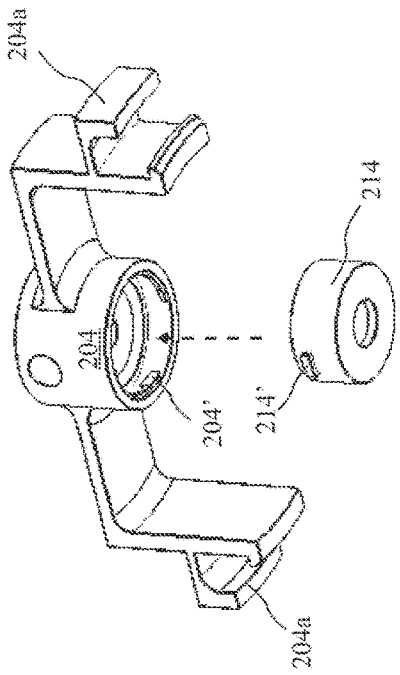
FIG. 37 shows engaging features of an exemplary embodiment of an attachment bridge and bearing connector according to the present invention.
Figure 38:
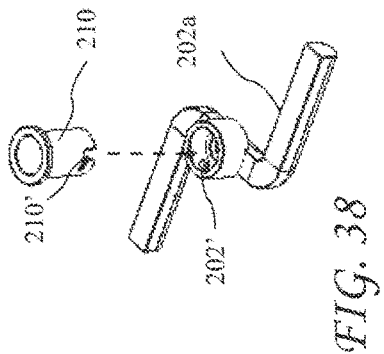
FIG. 38 shows engaging features of an exemplary embodiment of a water dispensing arms and a locking shaft according to the present invention.
Figure 36:
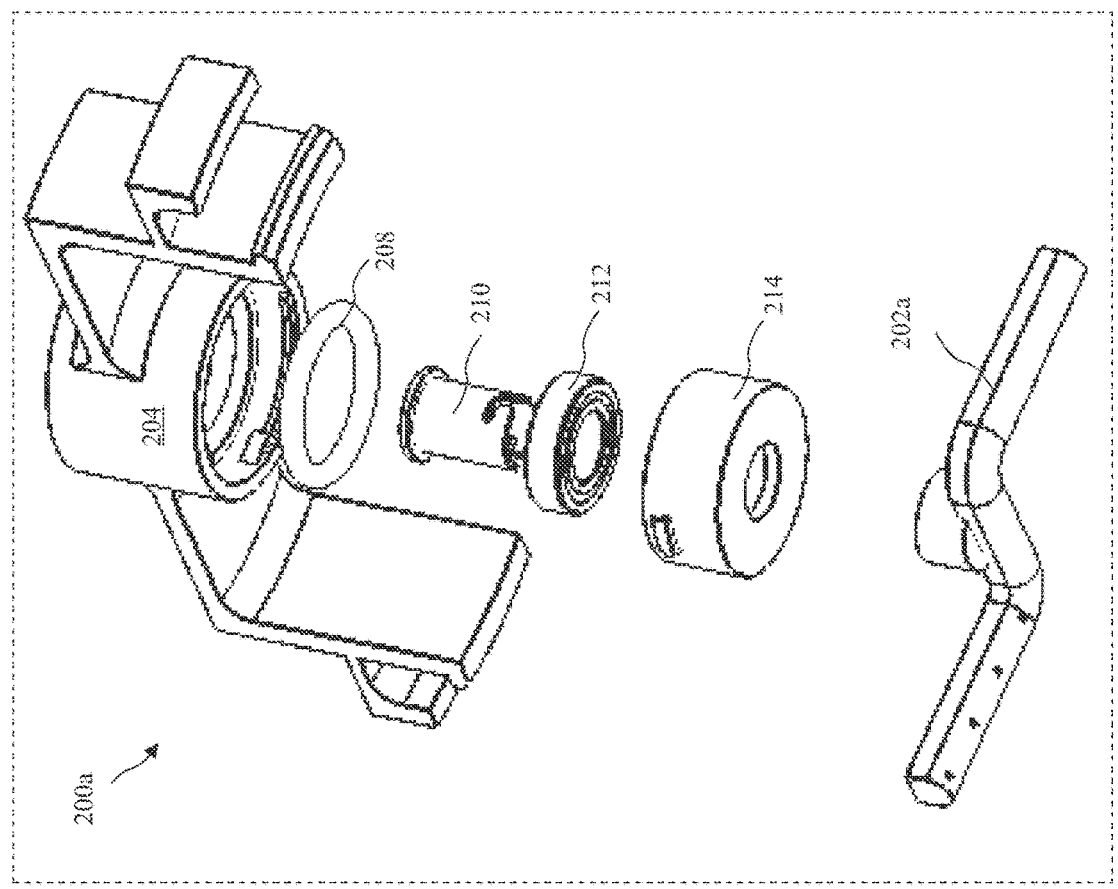
FIG. 36 shows a more detailed exploded view of an exemplary embodiment of a water-dispersing assembly including the water-dispersing arms according to the present invention.

A more detailed exploded view of the water-dispersing assembly 200*a* is shown in FIG. 36, engaging clips 204*a* of the attachment bridge 204 and bearing connector 214 are shown in FIG. 37, and engaging features of the water dispensing arms 202*a* and the locking shaft are shown in FIG. 38.

Figure 39C:
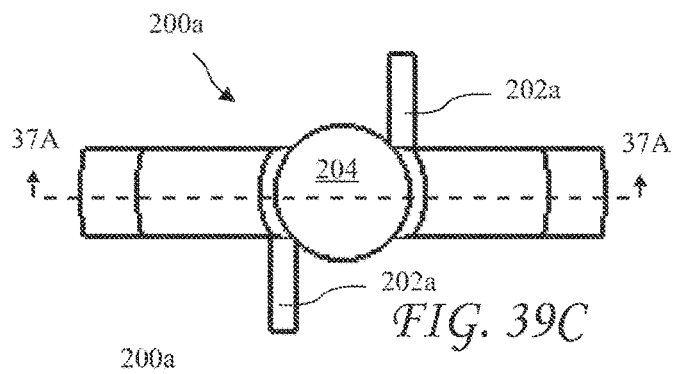
FIG. 39C shows a top view of an exemplary embodiment of a water-dispersing assembly including the water-dispersing arms according to the present invention.
Figure 39A:
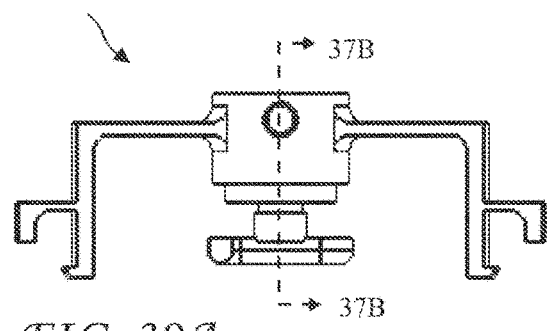
FIG. 39A shows a side view of an exemplary embodiment of a water-dispersing assembly including the water-dispersing arms according to the present invention.
Figure 39B:
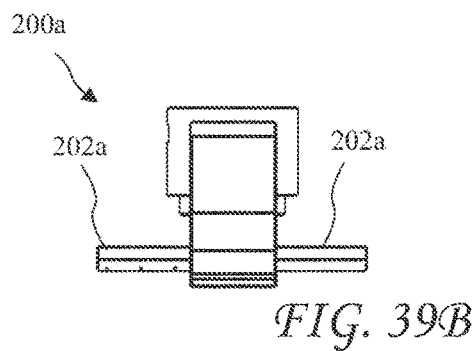
FIG. 39B shows an end view of an exemplary embodiment of a water-dispersing assembly including the water-dispersing arms according to the present invention.
Figure 39D:
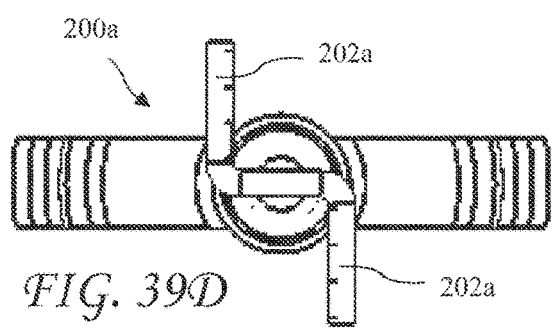
FIG. 39D shows a bottom view of an exemplary embodiment of a water-dispersing assembly including the water-dispersing arms according to the present invention.
Figure 40A:
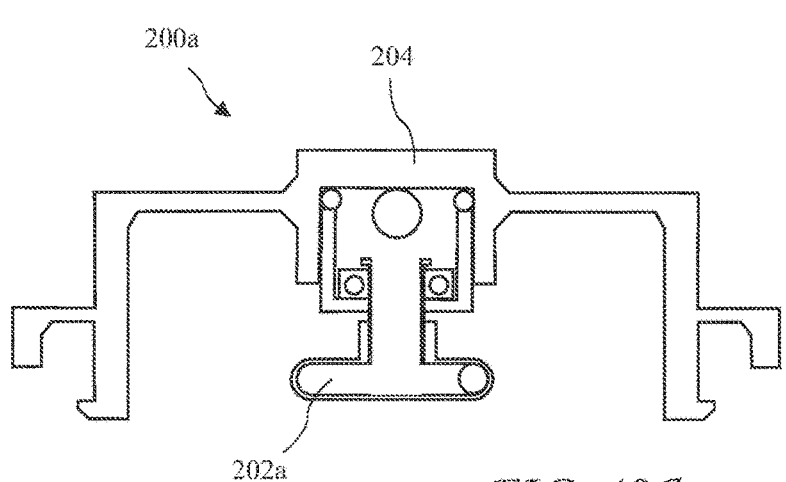
FIG. 40A shows a cross-sectional side view of an exemplary embodiment of a water-dispersing assembly including the water-dispersing arms according to the present invention taken along line 37A-37A of FIG. 39C.
Figure 40B:
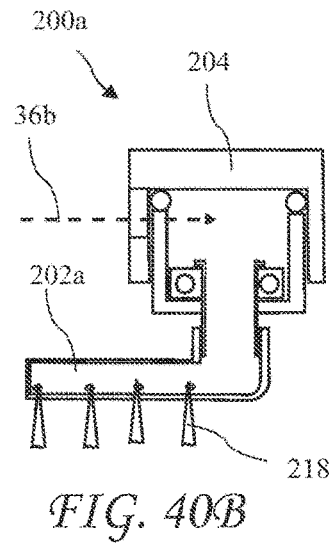
FIG. 40B shows a cross-sectional view of an exemplary embodiment of water-dispersing assembly including the water-dispersing arms according to the present invention taken along line 37B-37B of FIG. 39A.

A side view of the water-dispersing assembly 200*a* is shown in FIG. 39A, an end view of the water-dispersing assembly 200*a* is shown in FIG. 39B, a top view of the water-dispersing assembly 200*a* is shown in FIG. 39C, and a bottom view of the water-dispersing assembly 200*a* is shown in FIG. 39D. A cross-sectional side view of the water-dispersing assembly 200*a* taken along line 37A-37A of FIG. 39C is shown in FIG. 40A, and a cross-sectional view of the water-dispersing assembly 200*a* taken along line 37B-37B of FIG. 39A is shown in FIG. 40B. The flow 36*b* from the heating element 34 is provided to the water-dispersing assembly 200*a* and a spray pattern 218 from the water dispensing arms 202*a* results.

Figure 41A:
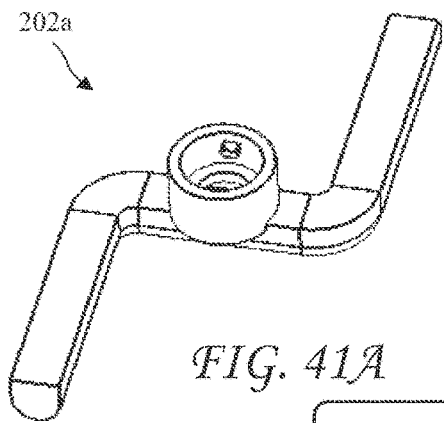
FIG. 41A shows a top isometric view of an exemplary embodiment of water-dispersing arms according to the present invention.
Figure 41B:
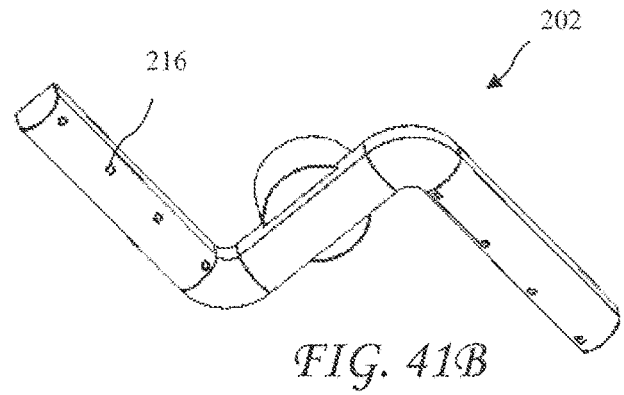
FIG. 41B shows a bottom isometric view of an exemplary embodiment of water-dispersing arms according to the present invention.
Figure 42C:
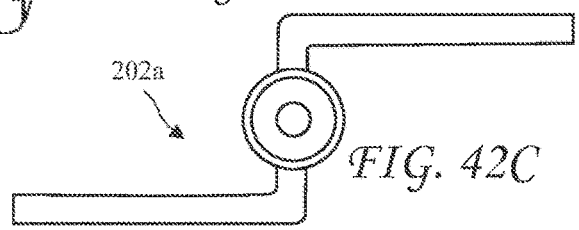
FIG. 42C shows a top view of an exemplary embodiment of water-dispersing arms according to the present invention.
Figure 42A:
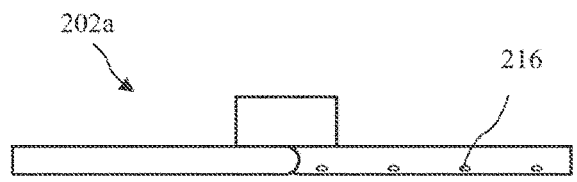
FIG. 42A shows a side view of an exemplary embodiment of water-dispersing arms according to the present invention.
Figure 42B:
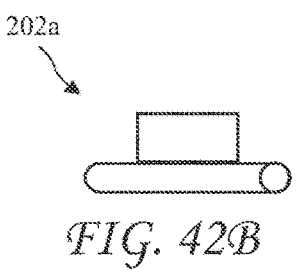
FIG. 42B shows an end view of an exemplary embodiment of water-dispersing arms according to the present invention.
Figure 42D:
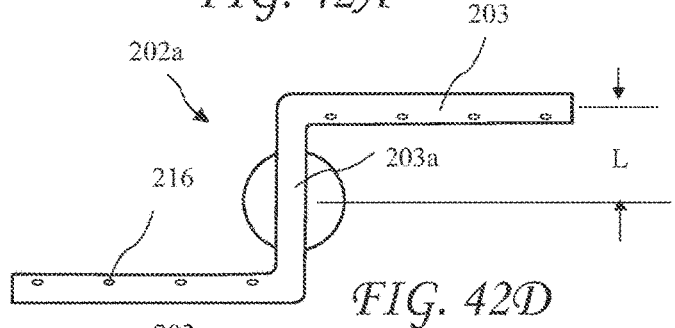
FIG. 42D shows a bottom view of an exemplary embodiment of water-dispersing arms according to the present invention.

A top isometric view of the water-dispersing arms 202*a* is shown in FIG. 41A, a bottom isometric view of the water-dispersing arms 202*a* is shown in FIG. 41B, a side view of the water-dispersing arms 202*a* is shown in FIG. 42A, an end view of the water-dispersing arms 202*a* is shown in FIG. 42B, a top view of the water-dispersing arms 202*a* is shown in FIG. 42C, and a bottom view of the water-dispersing arms 202*a* is shown in FIG. 42D. Right and left arms 203 of the water-dispersing arms 202*a* are laterally (for example, in the horizontal plane) offset by a center portion 203*a* at a distance L.

Figure 43A:
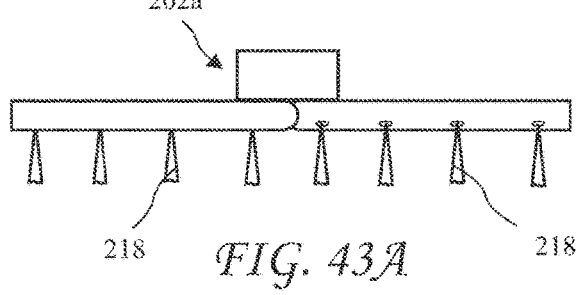
FIG. 43A shows a side view of an exemplary embodiment of water-dispersing arms and a spray pattern according to the present invention.
Figure 43B:
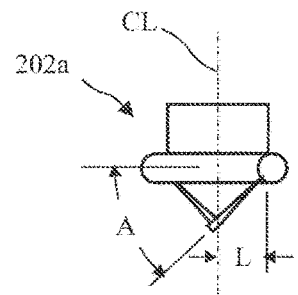
FIG. 43B shows an end view of an exemplary embodiment of water-dispersing arms and the spray pattern according to the present invention.

A side view of the water-dispersing arms 202*a* and a spray pattern 218 is shown in FIG. 43A and an end view of the water-dispersing arms and the spray pattern 218 is shown in FIG. 43B. The water-dispersing arms 202*a* include ports 216 providing the spray pattern 218. The ports are angled at an angle A from a vertical centerline CL of the water-dispersing arms 202*a*. The angle A is preferably between 30 and 60 degrees, and is more preferably about 45 degrees. The angle A is selected to provide torque to rotate the water-dispersing arms 202*a* during operation. The offset L is selected to direct the spray pattern 218 from both arms 203 to contact the brewing material along a generally straight line (see FIG. 43B). In the absence of the offset L, the contact of the two spray patterns from the two arm 203 would be displaced outward.

Figure 44A:
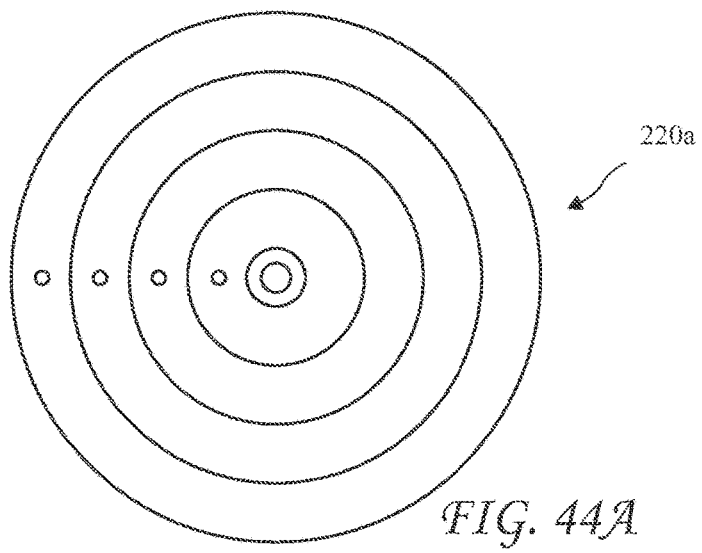
FIG. 44A shows a top view of water coverage provided by an exemplary embodiment of water-dispersing arms according to the present invention.
Figure 44B:
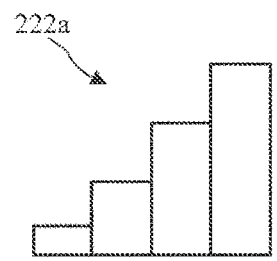
FIG. 44B shows a distribution of water coverage provided by an exemplary embodiment of water-dispersing arms according to the present invention.

A top view of water coverage provided by the water-dispersing arms 202*a* is shown in FIG. 44A and a distribution of water coverage provided by the water-dispersing arms 202*a* is shown in FIG. 44B. The spray pattern 218 provides the same amount of water to each ring; however, the outside ring has about eight times the area of the inside ring, and thus receives about one eighth the water per unit area.

Figure 45A:
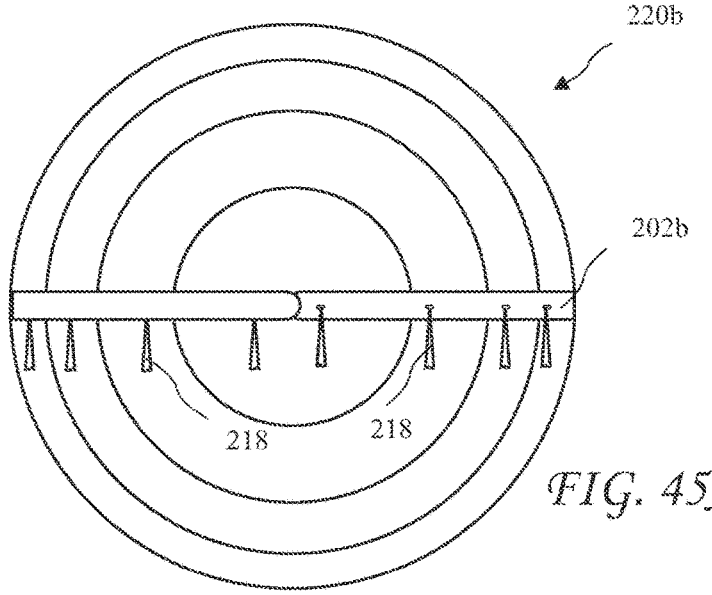
FIG. 45A shows a top view of water coverage provided by an exemplary embodiment of water-dispersing arms according to the present invention.
Figure 45B:
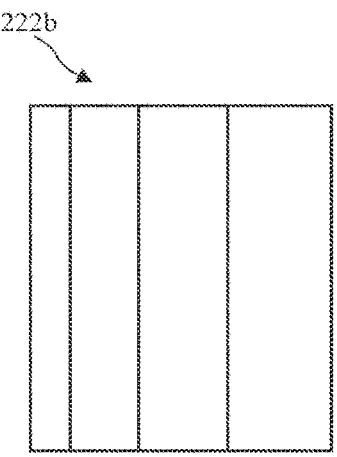
FIG. 45B shows a distribution of water coverage provided by an exemplary embodiment of water-dispersing arms according to the present invention.

A top view of water coverage provided by water-dispersing arms 202*b* is shown in FIG. 45A and a distribution of water coverage provided by the water-dispersing arms 202*b* is shown in FIG. 45B. The spacing of the ports 216 is adjusted to provide about the same water per unit area to all of the rings.

Figure 46A:
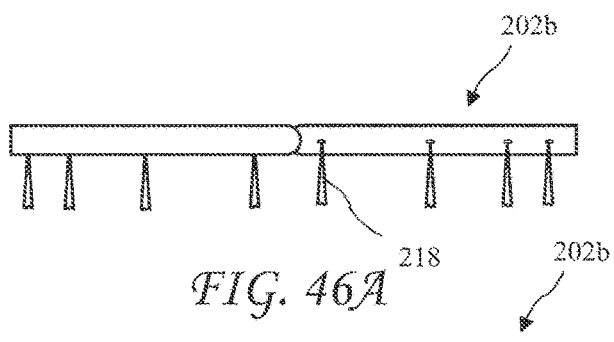
FIG. 46A shows a side view of an exemplary embodiment of water-dispersing arms according to the present invention.
Figure 46B:
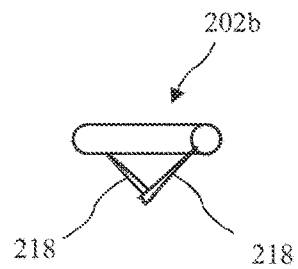
FIG. 46B shows an end view of an exemplary embodiment of water-dispersing arms according to the present invention.
Figure 46C:
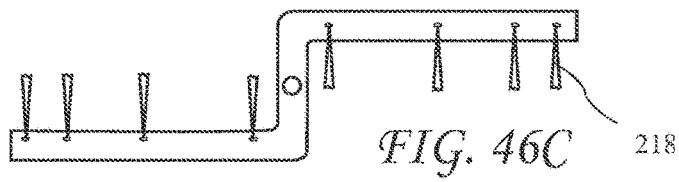
FIG. 46C shows a bottom view of an exemplary embodiment of water-dispersing arms according to the present invention.

A side view of the water-dispersing arms 202b is shown in FIG. 46A, an end view of the water-dispersing arms 202b is shown in FIG. 46A, and a bottom view of the water-dispersing arms 202b is shown in FIG. 46C. The water-dispersing arms 202b are otherwise similar to the water-dispersing arms 202a.

A beverage brewer 10b including an electric motor 224 to rotate the water-dispersing arms 202c is shown in FIG. 47, a side view of the water-dispersing arms 202c is shown in FIG. 48A, a side view of the water-dispersing arms 202c is shown in FIG. 48B, a side view of the water-dispersing arms 202c is shown in FIG. 48C, and a side view of the water-dispersing arms 202c is shown in FIG. 48D. The water-dispersing arms 202c include center ports 216a aimed directly downward. The ports 216a do not require angling because the ports 216a aim the spray pattern directly downward.

An example of components of a non-drip beverage brewer 10c are shown in FIG. 49. The components include the water tank 18 and a heater 34a. Unlike the drip beverage brewer, the beverage brewer 10b can include a mechanical pump 302 controlled by a processor 300. The processor 300 can control the pump 302 to provide pulses of water 36b for a water dispersion system including the piston assembly 40, or can provide either a pulsed or continuous stream of water to a water-dispersing assembly 200a. The processor 300 can also control a solenoid 304 or similar device replacing the piston assembly 40 in embodiments including the piston assembly 40.

Water can be manually provided to the movable water-dispensing member in a simple embodiment of the brewer, such that advantageous water dispersion into the brewing material holder can efficiently brew a beverage.

Figure 50:
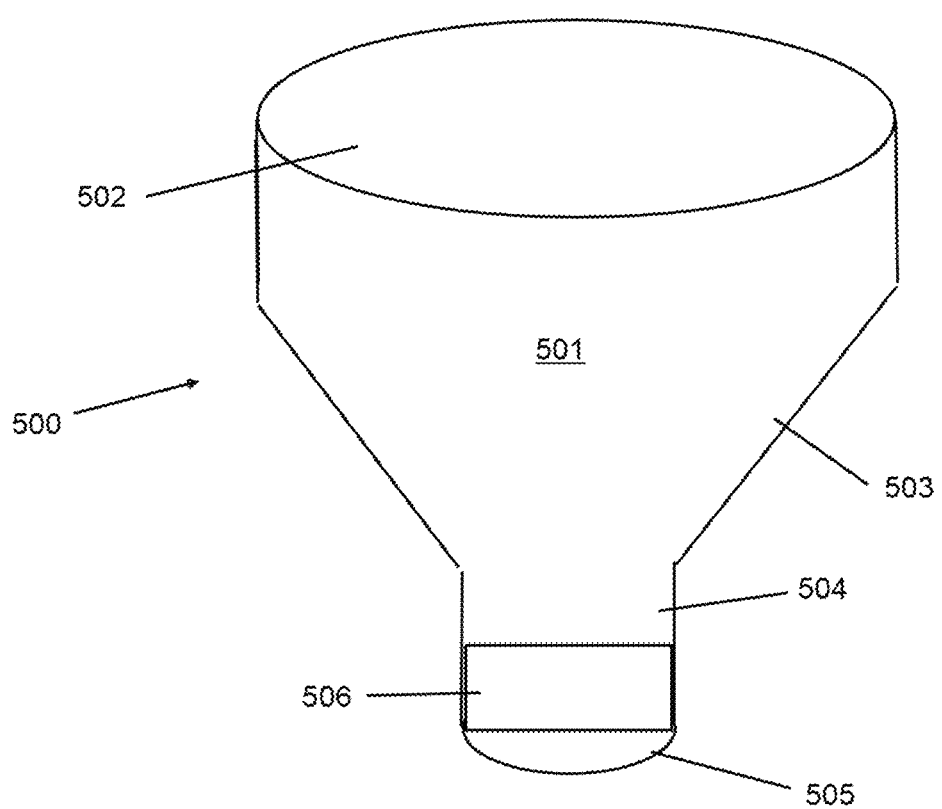
FIG. 50 shows an exemplary reservoir/funnel of the present invention.

For example, with reference to FIG. 50, the water-dispersing assembly can include a reservoir 500 having an outlet 505, outflow from which can be provided to the movable water-dispensing member by positioning of the reservoir 500, either by the user or by coupling the reservoir to the brewer body. For example, the reservoir 500 can be, or can include, a funnel 501. As shown, the exemplary funnel 501 includes an open top 502 that is configured to receive the liquid, slanted walls 503 configured to direct the received liquid toward the outlet 505, and a narrower outlet region 504 feeding the outlet 505.

The movable water-dispensing member can be configured to move, for example to rotate, due to a force of pressure provided by the flow of liquid from the outlet 505 of the funnel. The force of pressure provided by the flow of liquid can be caused, for example, by gravity, that is, by the weight of the liquid in the funnel 501 forcing a downward flow through the outlet 505, the force of which when entering the interior of the movable water-dispensing member casus the member to move, due to the design and arrangement of the ports in the member.

The pressure effect of the funnel or other reservoir can be enhanced by including a constricted portion 506 within the funnel, configured to provide a venturi effect.

Figure 51:
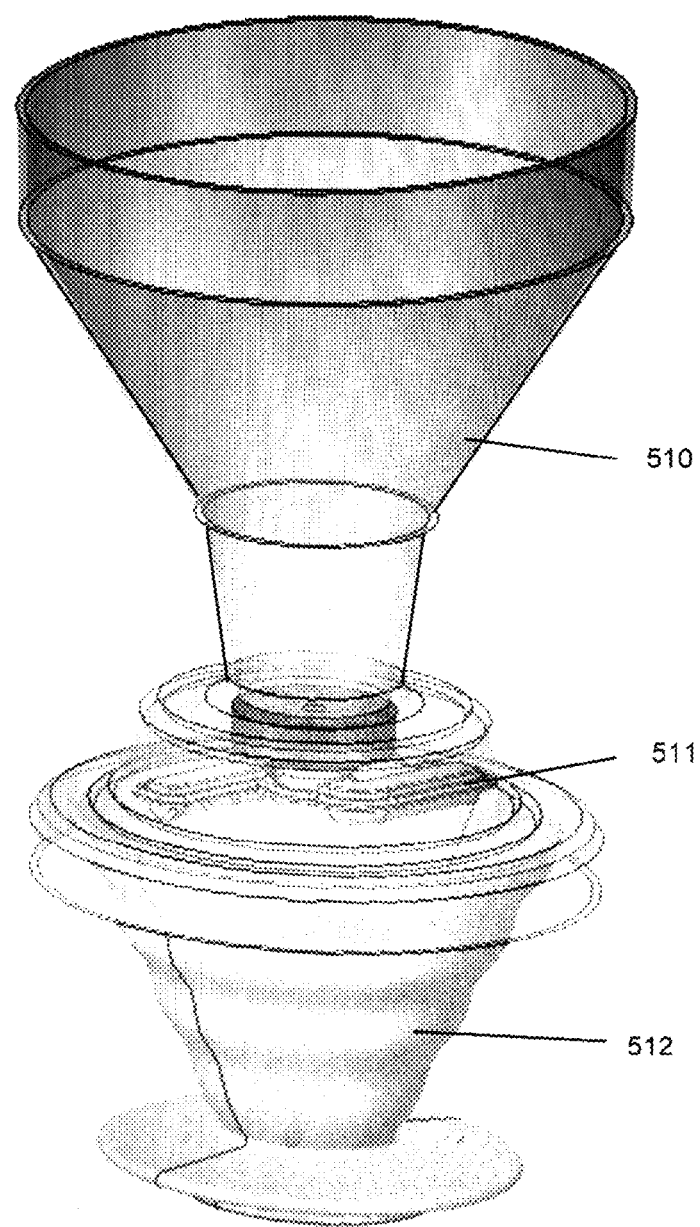
FIG. 51 shows an exemplary reservoir/funnel of the present invention coupled to a movable water-dispensing member above a brewing material holder.

FIG. 51 shows an exemplary reservoir/funnel 510 coupled to a movable water-dispensing member 511 above a brewing material holder 512. Thus, the reservoir 510 can be coupled to the movable water-dispensing member 511 for maximum efficiency and pressure transfer to provide movement of the water-dispensing member 511.

While the invention herein disclosed has been described by means of specific exemplary embodiments and applications thereof, numerous modifications and variations could be made thereto by those skilled in the art without departing from the scope of the invention set forth in the claims.

I claim:

1. A beverage brewer, comprising:
    a body;
    a brewing material holder that is removably couplable to the body; and
    a movable water-dispensing member configured to receive a flow of liquid;
    wherein the water-dispensing member includes first and second arms;
    wherein the first arm includes a first plurality of ports arranged on an underside of the first arm, and the second arm includes a second plurality of ports arranged on an underside of the second arm;
    wherein the first and second pluralities of ports are configured to release received liquid into the brewing material holder;
    wherein the movable water-dispensing member is configured to move due only to the flow of liquid through the first and second pluralities of ports.

2. The beverage brewer of claim 1, further comprising a water-dispersing assembly positionable to be disposed above the brewing material holder and configured to receive the flow of liquid, wherein the movable water-dispensing member is couplable to the water-dispersing assembly to receive the flow of liquid from the water-dispersing assembly.

3. The beverage brewer of claim 2, wherein the water-dispersing assembly includes a reservoir having an outlet.

4. The beverage brewer of claim 3, wherein the reservoir includes a funnel.

5. The beverage brewer of claim 1, wherein the movable water-dispensing member is configured to rotate due to the flow of liquid.

6. The beverage brewer of claim 1, wherein the movable water-dispensing member is configured to move due to a force of pressure provided by the flow of liquid.

7. The beverage brewer of claim 3, wherein the reservoir includes a constricted portion providing a venturi effect.

8. The beverage brewer of claim 1, further comprising:
    a water container; and
    a water heater in fluid communication with the water container.

9. The beverage brewer of claim 1, wherein the ports are angled away from a vertical centerline of the water-dispensing member.

10. The beverage brewer of claim 9, wherein the ports are configured to produce a spray pattern having a horizontal component.

11. The beverage brewer of claim 10, wherein the spray pattern is configured to provide a force that generates torque to rotate the water-dispensing member.

12. The coffee maker of claim 1, wherein:
    the water-dispensing member includes a center portion; and
    the first and second arms extend in opposite directions from the center portion.

13. The beverage brewer of claim 6, wherein the force of pressure provided by the flow of liquid is caused by the weight of the liquid.

14. The beverage brewer of claim 5, wherein the movable water-dispensing member is configured to rotate due only to the flow of liquid.

15. A beverage brewer, comprising:
    a body;

a brewing material holder that is removably couplable to the body;

a movable water-dispensing member configured to receive a flow of liquid and including at least one port configured to release received liquid into the brewing material holder; and a water-dispersing assembly positionable to be disposed above the brewing material holder and configured to receive the flow of liquid, wherein the movable water-dispensing member is couplable to the water-dispersing assembly to receive the flow of liquid from the water-dispersing assembly;

wherein the movable water-dispensing member is configured to move due to a force of pressure provided by the flow of liquid;

wherein the water-dispersing assembly includes a reservoir having an outlet; and wherein the reservoir includes a funnel.

16. A beverage brewer, comprising:

holding means, removably couplable to the body, for supporting ground brewing material;

movable water-dispensing means for receiving a flow of liquid and for moving due only to a force of pressure provided by the flow of liquid; and body means for supporting the holding means and the movable water-dispensing means;

wherein the movable water-dispensing means includes extension means for extending from and rotating about an axis of the movable water-dispensing means; and wherein the movable water-dispensing means includes port means on an underside of the extension means for releasing received liquid into the holding means.

17. The beverage brewer of claim 14, wherein the movable water-dispensing means for moving due to a force of pressure provided by the flow of liquid is a means for moving due only to a force of pressure provided by the flow of liquid.

18. The beverage brewer of claim 14, wherein the movable water-dispensing means for moving due to a force of pressure provided by the flow of liquid is a means for rotating due to a force of pressure provided by the flow of liquid.

19. The beverage brewer of claim 16, wherein the movable water-dispensing means for moving due to a force of pressure provided by the flow of liquid is a means for rotating due only to a force of pressure provided by the flow of liquid.

20. The beverage brewer of claim 14, further comprising water-dispersing means for receiving the flow of liquid above the brewing material holder and for providing the flow of liquid to the movable water-dispensing means;

wherein the water-dispersing means includes reservoir means for containing liquid, having an outlet; and wherein the reservoir means includes funnel for directing liquid in the reservoir means to the outlet.

* * * * *